(12) United States Patent
Kawai et al.

(10) Patent No.: US 11,240,296 B2
(45) Date of Patent: Feb. 1, 2022

(54) DISTRIBUTED PROCESSING SYSTEM AND DISTRIBUTED PROCESSING METHOD

(71) Applicant: Nippon Telegraph and Telephone Corporation, Tokyo (JP)

(72) Inventors: Kenji Kawai, Tokyo (JP); Junichi Kato, Tokyo (JP); Huycu Ngo, Tokyo (JP); Yuki Arikawa, Tokyo (JP); Tsuyoshi Ito, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/287,063

(22) PCT Filed: Oct. 7, 2019

(86) PCT No.: PCT/JP2019/039450
§ 371 (c)(1),
(2) Date: Apr. 20, 2021

(87) PCT Pub. No.: WO2020/085059
PCT Pub. Date: Apr. 30, 2020

(65) Prior Publication Data
US 2021/0377339 A1 Dec. 2, 2021

(30) Foreign Application Priority Data
Oct. 22, 2018 (JP) ............................. JP2018-198231

(51) Int. Cl.
*G06F 15/16* (2006.01)
*H04L 29/08* (2006.01)
*H04L 12/24* (2006.01)

(52) U.S. Cl.
CPC .......... *H04L 67/1031* (2013.01); *H04L 41/16* (2013.01); *H04L 67/1027* (2013.01); *H04L 67/1029* (2013.01); *H04L 67/1038* (2013.01)

(58) Field of Classification Search
CPC ............ H04L 67/1031; H04L 67/1027; H04L 67/1029; H04L 67/1038; H04L 41/16
(Continued)

(56) References Cited

U.S. PATENT DOCUMENTS 7,266,082 B2 * 9/2007 Xu .......................... H04L 45/00
370/238
7,289,520 B2 * 10/2007 Xu ........................ H04L 67/104
370/255

(Continued)

OTHER PUBLICATIONS

Takuya Akiba, "Distributed deep learning package Chainer MN release", Preferred Infrastructure, <https://research.preferred.jp/2017/05/chainermn-beta-release/>, May 9, 2017, 9 pages.

*Primary Examiner* — Alicia Baturay
(74) *Attorney, Agent, or Firm* — Slater Matsil, LLP

(57) ABSTRACT

A first distributed processing node transmits distributed data to a second distributed processing node as intermediate consolidated data. A third distributed processing node generates intermediate consolidated data after update from received intermediate consolidated data and distributed data, and transmits the intermediate consolidated data to a fourth distributed processing node. The first distributed processing node transmits the received intermediate consolidated data to fifth distributed processing node as consolidated data. The third distributed processing node transmits the received consolidated data to a sixth distributed processing node. When an aggregation communication time period required by each distributed processing node to consolidate the distributed data or an aggregation dispatch communication time period being a total time period of the aggregation (Continued)

communication time period and a time period required by each distributed processing node to dispatch the consolidated data exceeds a predetermined time period, the first distributed processing node issues a warning.

8 Claims, 17 Drawing Sheets

(58) Field of Classification Search
USPC .......................................................... 709/201
See application file for complete search history.

(56) References Cited

U.S. PATENT DOCUMENTS

| | | | | |
|---|---|---|---|---|
| 7,379,428 B2* | 5/2008 | Xu | ............................ | H04L 45/04 370/254 |
| 7,454,520 B2* | 11/2008 | Zhang | .................... | H04L 67/104 709/238 |
| 7,483,391 B2* | 1/2009 | Xu | ............................ | H04L 45/02 370/254 |
| 7,554,988 B2* | 6/2009 | Zhang | ..................... | H04L 45/04 370/255 |
| 7,613,796 B2* | 11/2009 | Harvey | ..................... | H04L 12/56 709/220 |
| 7,660,320 B2* | 2/2010 | Wepiwe | ................... | H04L 63/12 370/406 |
| 7,747,777 B2* | 6/2010 | Previdi | .................... | H04L 45/04 709/241 |
| 7,773,609 B2* | 8/2010 | Kobara | .................... | H04L 45/54 370/400 |
| 7,788,400 B2* | 8/2010 | Tang | ........................ | H04L 45/64 709/238 |
| 7,870,133 B2* | 1/2011 | Krishnamoorthy | ..... | G06F 16/93 707/736 |
| 7,907,544 B2* | 3/2011 | Graupner | .............. | H04L 69/329 370/254 |
| 7,953,858 B2* | 5/2011 | Xu | ............................ | H04L 29/06 709/227 |
| 7,974,221 B2* | 7/2011 | Tamassia | .............. | H04L 67/104 370/256 |
| 8,041,773 B2* | 10/2011 | Abu-Ghazaleh | ........ | H04L 47/70 709/209 |
| 8,041,942 B2* | 10/2011 | Narayanan | ............ | H04L 9/3215 713/156 |
| 8,051,205 B2* | 11/2011 | Roy | ...................... | G06F 16/1834 709/244 |
| 8,069,208 B2* | 11/2011 | Sidhu | ...................... | H04L 51/04 709/206 |
| 8,126,849 B2* | 2/2012 | Schwan | .............. | H04L 67/1048 707/655 |
| 8,208,477 B1* | 6/2012 | Xiong | .................. | H04L 67/1065 370/400 |
| 8,385,267 B2* | 2/2013 | Wu | .......................... | H04L 45/64 370/328 |
| 8,484,382 B2* | 7/2013 | Das | ....................... | H04L 67/1059 709/249 |
| 8,495,130 B2* | 7/2013 | Maenpaa | ............ | H04L 67/1065 709/201 |
| 8,701,107 B2* | 4/2014 | Gulati | .................... | H04L 67/104 718/1 |
| 8,762,542 B2* | 6/2014 | Pennington | ........... | H04L 63/104 709/227 |
| 8,768,962 B2* | 7/2014 | Laron | ................. | G06F 16/1873 707/781 |
| 8,825,768 B2* | 9/2014 | Das | ....................... | H04L 67/104 709/205 |
| 8,856,784 B2* | 10/2014 | Gulati | ................. | G06F 9/45533 718/1 |
| 8,898,266 B2* | 11/2014 | Choi | ..................... | H04L 67/303 709/223 |
| 8,913,525 B2* | 12/2014 | Welin | ................ | H04L 29/12028 370/258 |
| 9,686,353 B2* | 6/2017 | Hautakorpi | ........... | H04L 67/104 |
| 2004/0205242 A1* | 10/2004 | Xu | ........................ | H04L 69/329 709/245 |
| 2005/0108203 A1* | 5/2005 | Tang | ..................... | H04L 69/329 |
| 2008/0130516 A1* | 6/2008 | You | ..................... | H04L 67/1065 370/254 |
| 2009/0216887 A1* | 8/2009 | Hertle | ................. | H04L 61/6013 709/227 |
| 2009/0323700 A1* | 12/2009 | Schwan | ................. | H04L 45/64 370/400 |
| 2014/0006504 A1* | 1/2014 | Jimenez | ............. | H04L 67/1057 709/204 |

\* cited by examiner

DISTRIBUTED PROCESSING SYSTEM AND DISTRIBUTED PROCESSING METHOD

This patent application is a national phase filing under section 371 of PCT/JP2019/039450, filed Oct. 7, 2019, which claims the priority of Japanese patent application no. 2018-198231, filed Oct. 22, 2018, each of which is incorporated herein by reference in its entirety.

TECHNICAL FIELD

The present invention relates to a distributed processing system including a plurality of distributed processing nodes, and particularly relates to a distributed processing system and a distributed processing method for aggregating numerical data from each distributed processing node to generate consolidated data, and dispatching consolidated data to each distributed processing node.

BACKGROUND

In deep learning, the accuracy of inference is improved by updating a weight of each neuron model (a coefficient multiplied by a value output by a neuron model at a previous stage) based on input sample data for a learning target constituted by a multi-layered neuron model.

A mini batch method is typically used for a method of improving the accuracy of inference. In a mini batch method, a gradient calculation process of calculating a gradient with respect to the weight for each piece of sample data, a consolidation process of consolidating the gradient for a plurality of different pieces of sample data (summing up the gradients, obtained for each piece of sample data, for each weight), and a weight updating process of updating each weight based on the consolidated gradient are repeated.

These processes, particularly the gradient calculation process, require many iterated computations, but there is a problem in that a time required for deep learning increases as the number of weights and the number of pieces of input sample data increase in order to improve the accuracy of inference.

In order to increase the speed of the gradient calculation process, a distributed processing method is used. Specifically, a plurality of distributed processing nodes are provided, and each of the nodes performs a gradient calculation process for each of different pieces of sample data. As a result, as the number of pieces of sample data that can be processed per unit time in proportion to the number of nodes can be increased, the speed of the gradient calculation process can be increased (see NPL 1).

In distributed processing for deep learning, in order to perform a consolidation process, communication (aggregation communication) for transferring data (distributed data) obtained for each distributed processing node to a node that performs a consolidation process, processing (inter-node consolidation processing) for performing consolidation based on the data acquired in the aggregation communication, and communication (dispatch communication) for dispatching the consolidated data (consolidated data) acquired from each distributed processing node to each distributed processing node are required between a gradient calculation process in which each distributed processing node calculates a gradient for a weight for each piece of sample data and an in-node consolidation process in which each distributed processing node sums up the gradient obtained for each piece of the sample data separately for each weight and a weight updating process for updating each weight based on the consolidated gradient.

A time period required for the aggregation communication and the dispatch communication described above is unnecessary in a system that carries out deep learning in a single node, and is thus a factor of reducing a processing speed when distributed processing for deep learning is performed. In recent years, deep learning has been applied to more complicated problems, and a total number of weights tends to increase. For this reason, as the amount of distributed data and the amount of the consolidated data have increased, an aggregation communication time and a dispatch communication time have increased.

In this manner, a distributed processing system of deep learning has a problem that, because of an increase in the number of distributed processing nodes, the effect of increasing the speed of deep learning is reduced due to increases in the aggregation communication time and the dispatch communication time.

FIG. 18 illustrates a relationship between the number of distributed processing nodes and processing performance of deep learning in the distributed processing system of the related art, reference numeral 200 denotes an ideal relationship between the number of distributed processing nodes and processing performance (performance a the number of nodes), and reference numeral 201 denotes an actual relationship between the number of distributed processing nodes and processing performance. A total amount of distributed data being an input of the inter-node consolidation process increases in proportion to the number of distributed processing nodes. The reason why actual processing performance is not enhanced in proportion to the number of distributed processing nodes, however, is that a time period required for the aggregation communication increases because a communication speed of a consolidation processing node is limited to a physical speed of communication ports of the node or a lower speed.

CITATION LIST

Non Patent Literature

NPL 1: Takuya Akiba, "Distributed deep learning package Chainer MN release",
Preferred Infrastructure, 2017, the Internet <https://research.preferred.jp/2017/05/chainermn-beta-release/>

SUMMARY

Technical Problem

Embodiments of the present invention are made in consideration of such circumstances as described above, and an embodiment provides a distributed processing system and a distributed processing method capable of performing effective distributed processing in application to deep learning in the distributed processing system including a plurality of distributed processing nodes.

Means for Solving the Problem

A distributed processing system according to embodiments of the present invention includes: N (N is an integer of 2 or greater) distributed processing nodes disposed in a ring shape and connected to adjacent nodes via a communication path, wherein an n-th (n=1, . . . , N) distributed processing node includes a first communication port configured to perform simultaneous bidirectional communication with an $n^+$-th ($n^+=n+1$; note that $n^+=1$ if $n=N$) distributed processing node and a second communication port configured to perform simultaneous bidirectional communication with an $n^-$-th ($n^-=n-1$; note that $n^-=N$ if $n=1$) distributed processing node. Each of the distributed processing nodes generates distributed data for each of M (M is an integer of 2 or greater) weights w [m] (m=1, . . . , M) of a neural network of a learning target. Out of the N distributed processing nodes, a first distributed processing node specified in advance uses the distributed data generated in the first distributed processing node as first consolidated data, packetizes the first consolidated data in order of numbers m of the weights w [m], and transmits the first consolidated data from the first communication port of the first distributed processing node to a second distributed processing node, out of the N distributed processing nodes. A k-th distributed processing node except the first distributed processing node generates updated first consolidated data by calculating a sum of the first consolidated data received via the second communication port of the k-th distributed processing node from a (k−1)-th distributed processing node and the distributed data generated in the k-th (k=2, . . . , N) distributed processing node for each corresponding one of the weights w [m], packetizes the first consolidated data in the order of the numbers m, and transmits the first consolidated data from the first communication port of the k-th distributed processing node to a $k^+$-th ($k^+=k+1$; note that $k^+=1$ if $k=N$) distributed processing node. The first distributed processing node uses the first consolidated data received via the second communication port of the first distributed processing node from an N-th distributed processing node as second consolidated data, packetizes the second consolidated data in the order of the numbers m, and transmits the second consolidated data from the second communication port of the first distributed processing node to the N-th distributed processing node. The k-th distributed processing node packetizes the second consolidated data received via the first communication port of the k-th distributed processing node from the $k^+$-th distributed processing node in the order of the numbers m, and transmits the second consolidated data from the second communication port of the k-th distributed processing node to the (k−1)-th distributed processing node. The first distributed processing node receives the second consolidated data from the second distributed processing node via the first communication port of the first distributed processing node, each distributed processing node updates the weights w [m] of the neural network, based on the received second consolidated data, and when an aggregation communication time period required by each of the distributed processing nodes to consolidate the distributed data or an aggregation dispatch communication time period being a total time period of the aggregation communication time period and a time period required by each of the distributed processing nodes to dispatch the second consolidated data exceeds a predetermined maximum consolidation delay time period, the first distributed processing node issues a warning indicating a consolidation delay anomaly.

In one configuration example of the distributed processing system according to embodiments of the present invention, each of the distributed processing nodes includes: an in-node consolidation processing unit configured to generate the distributed data; a first transmission unit configured to, when the distributed processing node itself functions as the first distributed processing node, packetize the first consolidated data in the order of the numbers m of the weights w [m] and transmits the first consolidated data from the first communication port of the distributed processing node itself to the second distributed processing node, and configured to, when the distributed processing node itself functions as the k-th distributed processing node, packetize the updated first consolidated data in the order of the numbers m and transmit the updated first consolidated data from the first communication port of the distributed processing node itself to the $k^+$-th distributed processing node; a first reception unit configured to acquire the first consolidated data from a packet received from the second communication port of the distributed processing node itself; a second transmission unit configured to, when the distributed processing node itself functions as the first distributed processing node, packetize the second consolidated data in the order of the numbers m and transmit the second consolidated data from the second communication port of the distributed processing node itself to the N-th distributed processing node, and configured to, when the distributed processing node itself functions as the k-th distributed processing node, packetize the received second consolidated data in the order of the numbers m and transmit the received second consolidated data from the second communication port of the distributed processing node itself to the (k−1)-th distributed processing node; a second reception unit configured to acquire the second consolidated data from a packet received from the first communication port of the distributed processing node itself; a consolidated data generation unit configured to generate the updated first consolidated data when the distributed processing node itself functions as the k-th distributed processing node; a weight updating processing unit configured to update the weights w [m] of the neural network, based on the received second consolidated data; a timer configured to, when the distributed processing node itself functions as the first distributed processing node, measure a time period from a time point when the first consolidated data is transmitted to the second distributed processing node to a time point when the first consolidated data is received from the N-th distributed processing node as the aggregation communication time period, and a time period from a time point when the first consolidated data is transmitted to the second distributed processing node to a time point when the second consolidated data is received from the second distributed processing node as the aggregation dispatch communication time period; and a warning issuing unit configured to, when the distributed processing node itself functions as the first distributed processing node, issue a warning indicating a consolidation delay anomaly when the aggregation communication time period or the aggregation dispatch communication time period exceeds the maximum consolidation delay time period.

In one configuration example of the distributed processing system according to embodiments of the present invention, the first distributed processing node regularly generates a management packet including a consolidation start confirmation flag indicating whether or not preparation for consolidating the distributed data is completed, before the first consolidated data is transmitted from the first communication port of the first distributed processing node, and transmits the management packet from at least one of the first communication port and the second communication port of the first distributed processing node to at least one of the second distributed processing node and the N-th distributed processing node, when the k-th distributed processing node receives the management packet from the (k−1)-th distributed processing node via the second communication port of the k-th distributed processing node or when the k-th distributed processing node receives the management packet from the $k^+$-th distributed processing node via the first communication port of the k-th distributed processing node and preparation for consolidating the distributed data is not completed in the k-th distributed processing node, the k-th distributed processing node updates a consolidation start confirmation flag included in the received management packet to a value indicating that the preparation for consolidating the distributed data is not completed and transmits the management packet after update from a communication port different from a port used to receive the management packet out of the first and second communication ports to the $k^+$-th distributed processing node or the (k−1)-th distributed processing node, and when the preparation for consolidating the distributed data is completed in the k-th distributed processing node, the k-th distributed processing node transmits the received management packet from a communication port different from a port used to receive the management packet out of the first and second communication ports to the $k^+$-th distributed processing node or the (k−1)-th distributed processing node, and when the first distributed processing node receives the management packet from the N-th distributed processing node via the second communication port of the first distributed processing node or when the first distributed processing node receives the management packet from the second distributed processing node via the first communication port of the first distributed processing node and the consolidation start confirmation flag included in the received management packet has a value indicating that preparation for consolidating the distributed data is completed, the first distributed processing node starts transmission of the first consolidated data.

Embodiments of the present invention provide a distributed processing method of a system including N (N is an integer of 2 or greater) distributed processing nodes disposed in a ring shape and connected to adjacent nodes via a communication path in which an n-th (n=1, . . . , N) distributed processing node includes a first communication port configured to perform simultaneous bidirectional communication with an $n^+$-th ($n^+$=n+1; note that $n^+$=1 if n=N) distributed processing node and a second communication port configured to perform simultaneous bidirectional communication with an $n^-$-th ($n^-$=n−1; note that $n^-$=N if n=1) distributed processing node. The distributed processing method includes: a first step at each of the distributed processing nodes of generating distributed data for each of M (M is an integer of 2 or greater) weights w [m] (m=1, . . . , M) of a neural network of a learning target; a second step at, out of the N distributed processing nodes, a first distributed processing node specified in advance of using the distributed data generated in the first distributed processing node as first consolidated data, packetizing the first consolidated data in order of numbers m of the weights w [m], and transmitting the first consolidated data from the first communication port of the first distributed processing node to a second distributed processing node; a third step at, out of the N distributed processing nodes, a k-th distributed processing node except the first distributed processing node of generating updated first consolidated data by calculating a sum of the first consolidated data received via the second communication port of the k-th distributed processing node from a (k−1)-th distributed processing node and the distributed data generated in the k-th (k=2, . . . , N) distributed processing node for each corresponding one of the weights w [m], packetizing the first consolidated data in the order of the numbers m, and transmitting the first consolidated data from the first communication port of the k-th distributed processing node to a $k^+$-th ($k^+$=k+1; note that $k^+$=1 if k=N) distributed processing node; a fourth step at the first distributed processing node of using the first consolidated data received via the second communication port of the first distributed processing node from an N-th distributed processing node as second consolidated data, packetizing the second consolidated data in the order of the numbers m, and transmitting the second consolidated data from the second communication port of the first distributed processing node to the N-th distributed processing node; a fifth step at the k-th distributed processing node of packetizing the second consolidated data received via the first communication port of the k-th distributed processing node from the $k^+$-th distributed processing node in the order of the numbers m, and transmitting the second consolidated data from the second communication port of the k-th distributed processing node to the (k−1)-th distributed processing node; a sixth step at the first distributed processing node of receiving the second consolidated data from the second distributed processing node via the first communication port of the first distributed processing node; a seventh step at each distributed processing node of updating the weights w [m] of the neural network, based on the received second consolidated data; an eighth step at the first distributed processing node of measuring an aggregation communication time period required by each of the distributed processing nodes to consolidate the distributed data or an aggregation dispatch communication time period being a total time period of the aggregation communication time period and a time period required by each of the distributed processing nodes to dispatch the second consolidated data; and a ninth step at the first distributed processing node, when the aggregation communication time period or the aggregation dispatch communication time period exceeds a predetermined maximum consolidation delay time period, of issuing a warning indicating a consolidation delay anomaly.

In one configuration example of the distributed processing method according to embodiments of the present invention, the third step includes, at the k-th distributed processing node, acquiring the first consolidated data from a packet received from the second communication port of the k-th distributed processing node, generating the updated first consolidated data, and packetizing the updated first consolidated data in the order of the numbers m and transmitting the updated first consolidated data to the $k^+$-th distributed processing node from the first communication port of the k-th distributed processing node. The fourth step includes, at the first distributed processing node, acquiring the first consolidated data from a packet received from the second communication port of the first distributed processing node and using the acquired first consolidated data as the second consolidated data, packetizing the second consolidated data in the order of the numbers m, and transmitting the second consolidated data from the second communication port of the first distributed processing node to the N-th distributed processing node. The fifth step includes, at the k-th distributed processing node, acquiring the second consolidated data from a packet received from the first communication port of the k-th distributed processing node and packetizing the received second consolidated data in the order of the numbers m and transmitting the received second consolidated data from the second communication port of the k-th distributed processing node to the (k−1)-th distributed processing node. The sixth step includes, at the first distributed processing node, acquiring the second consolidated data from a packet received from the first communication port of the first distributed processing node, and the eighth step includes, at the first distributed processing node, measuring a time period from a time point when the first consolidated data is transmitted to the second distributed processing node to a time point when the first consolidated data is received from the N-th distributed processing node as the aggregation communication time period, and a time period from a time point when the first consolidated data is transmitted to the second distributed processing node to a time point when the second consolidated data is received from the second distributed processing node as the aggregation dispatch communication time period.

One configuration example of the distributed processing method according to embodiments of the present invention further includes: a tenth step at the first distributed processing node of regularly generating a management packet including a consolidation start confirmation flag indicating whether or not preparation for consolidating the distributed data is completed, before the first consolidated data is transmitted from the first communication port of the first distributed processing node, and transmitting the management packet from at least one of the first communication port and the second communication port of the first distributed processing node to at least one of the second distributed processing node and the N-th distributed processing node; an eleventh step at the k-th distributed processing node, when the k-th distributed processing node receives the management packet from the (k−1)-th distributed processing node via the second communication port of the k-th distributed processing node or when the k-th distributed processing node receives the management packet from the $k^+$-th distributed processing node via the first communication port of the k-th distributed processing node and preparation for consolidating the distributed data is not completed in the k-th distributed processing node, updating a consolidation start confirmation flag included in the received management packet to a value indicating that the preparation for consolidating the distributed data is not completed and transmitting the management packet after update from a communication port different from a port used to receive the management packet out of the first and second communication ports to the $k^+$-th distributed processing node or the (k−1)-th distributed processing node, and using, when the preparation for consolidating the distributed data is completed in the k-th distributed processing node, the k-th distributed processing node to transmit the received management packet from a communication port different from a port used to receive the management packet out of the first and second communication ports to the $k^+$-th distributed processing node or the (k−1)-th distributed processing node; and a twelfth step at the first distributed processing node, when the first distributed processing node receives the management packet from the N-th distributed processing node via the second communication port of the first distributed processing node or when the first distributed processing node receives the management packet from the second distributed processing node via the first communication port of the first distributed processing node and the consolidation start confirmation flag included in the received management packet has a value indicating that preparation for consolidating the distributed data is completed, of starting transmission of the first consolidated data of the second step.

Effects of Embodiments of the Invention

According to embodiments of the present invention, aggregation communication from the n-th (n=1, . . . , N) distributed processing node to the $n^+$-th ($n^+$=n+1; note that $n^+$=1 if n=N) distributed processing node (a process of transmitting the first consolidated data to the $n^+$-th distributed processing node), an inter-node consolidation process performed by the k-th (k=2, . . . , N) distributed processing node (a process of calculating the updated first consolidated data, based on the received first consolidated data and the distributed data generated in the k-th (k=2, . . . , N) distributed processing node), and dispatch communication from the n-th distributed processing node to the $n^-$-th ($n^-$=n−1; note that $n^-$=N if n=1) distributed processing node (a process of dispatching the second consolidated data to the $n^-$-th each distributed processing node) can be performed in parallel substantially simultaneously, effective distributed processing can be performed, and thus learning efficiency of a neural network can be enhanced. In embodiments of the present invention, the first communication port and the second communication port are provided in each distributed processing node, and directions of the aggregation communication and the dispatch communication are set to be opposite to each other, such that there is no need to wait for the start of the dispatch communication until the aggregation communication is completed. Further, in embodiments of the present invention, the distributed processing for deep learning can be performed without providing a consolidation processing node, and a speed of the distributed processing is thus not limited due to a communication speed of the consolidation processing node. In addition, in embodiments of the present invention, a warning indicating a consolidation delay anomaly is issued when the aggregation communication time period or the aggregation dispatch communication time period exceeds a maximum consolidation delay time period, and thus a distributed processing system excellent in maintainability that is capable of immediately detecting an anomaly of disconnection of communication in the middle of the aggregation communication and the dispatch communication can be implemented.

Further, in embodiments of the present invention, transmission and reception of management packets is performed between the distributed processing nodes. With this configuration, the value of the maximum consolidation delay time period can be reduced, and the anomaly of the distributed processing system of disconnection of communication in the middle of the aggregation communication and the dispatch communication can be detected in a shorter period of time.

DETAILED DESCRIPTION OF ILLUSTRATIVE EMBODIMENTS

First Embodiment

Figure 1:
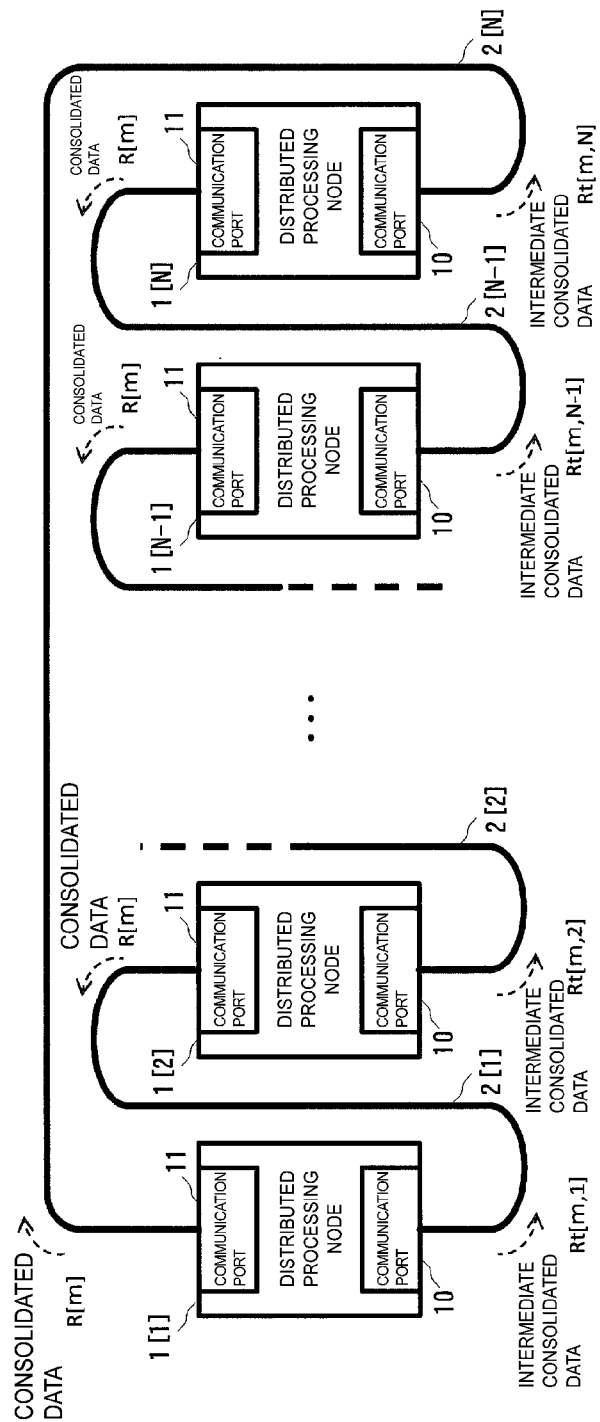
FIG. 1 is a block diagram illustrating a configuration example of a distributed processing system for deep learning according to a first embodiment of the present invention.

Hereinafter, embodiments of the present invention will be described with reference to the drawings. FIG. 1 is a block diagram illustrating a configuration example of a distributed processing system for deep learning according to a first embodiment of the present invention. The distributed processing system of FIG. 1 includes N (N is an integer of 2 or greater) distributed processing nodes 1 [n] (n=1, ..., N), and communication paths 2 [n] (n=1, ..., N) that allow a distributed processing node 1 [n] (n=1, ..., N) assigned a number n to mutually and bidirectionally communicate with another distributed processing node 1 [n+] assigned a succeeding number n+(n$^+$=n+1; note that n$^+$=1 if n=N). Note that, optionally, in some communication paths 2 [n] (n=1, ..., N), a relay processing node that relays communication can be interleaved as well as a transmission channel.

Each distributed processing node 1 [n] (n=1, ..., N) includes a communication port 10 and a communication port 11 that are capable of simultaneous bidirectional communication. The communication port 10 is a communication port for the distributed processing node 1 [n] to perform bidirectional communication with the distributed processing node 1 [n+] (n$^+$=n+1; note that n$^+$=1 if n=N), and is connected to the communication path 2 [n]. Further, the communication port 11 is a communication port for the distributed processing node 1 [n] to perform bidirectional communication with the distributed processing node [n$^-$] (n$^-$=n−1; note that n$^-$=N if n=1), and is connected to the communication path 2 [n$^-$].

Figure 2:
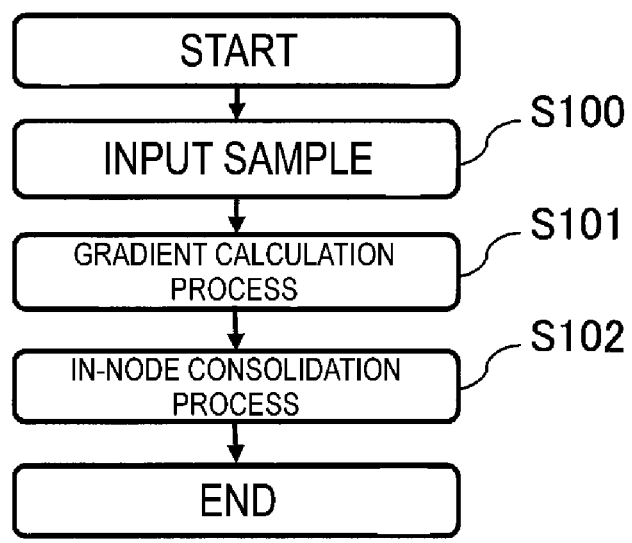
FIG. 2 is a flowchart illustrating a sample data input process, a gradient calculation process, and an in-node consolidation process of the distributed processing node according to the first embodiment of the present invention.

FIG. 2 is a flowchart illustrating a sample data input process, a gradient calculation process, and an in-node consolidation process of the distributed processing node 1 [n]. Each of the distributed processing nodes 1 [n] (n=1, ..., and N) inputs different S pieces of sample data x[n, s] (s=1, ..., and s) for each mini batch from a data collection node not illustrated in the drawing (S is an integer equal to or greater than 2) (step S100 in FIG. 2).

Note that the present invention is not limited to a sample data collecting method performed by a data collection node and a method of dividing collected sample data into N sets and dispatching each of the sets to each of distributed processing nodes 1 [n], and any method can be applied.

When sample data x[n, s] is input, each of the distributed processing nodes 1 [n] (n=1, ..., and N) calculates a gradient G[m, n, s] of a loss function of the neural network for each piece of sample data x[n, s] with respect to each of M weights w [m] (m=1, ..., and M) of the neural network to be learned (M is an integer equal to or greater than 2) (step S101 in FIG. 2).

A method of constructing the neural network in each of the distributed processing nodes 1 [n] as software, a weight w [m] of the neural network, a loss function, which is an indicator indicating the degree of poorness of performance of the neural network, and a gradient G[m, n, s] of the loss function are well-known techniques, and thus detailed description thereof will be omitted.

Next, each of the distributed processing nodes 1 [n] (n=1, ..., and N) generates and stores distributed data D [m, n] (m=1, ..., M), which is numerical values obtained by consolidating a gradient G[m, n, s] for each piece of sample data, for each weight w [m] (step S102 in FIG. 2). A calculation equation for the distributed data D [m, n] is as follows.

Equation 1

$$D[m,n]=\Sigma_{s=1,\ldots,S}G[m,n,s] \qquad (1)$$

Note that a gradient calculation process in step S101 and an in-node consolidation process in step S102 can be performed in a pipelined manner in units of sample data (the gradient calculation process for any sample data and the in-node consolidation process of consolidating a gradient obtained from one sample data prior to the sample data can be performed at the same time).

Further, after generating the distributed data D [m, n] (m=M), each distributed processing node 1 [n] (n=N) performs aggregation communication between the distributed processing nodes, and performs an inter-node consolidation process for generating consolidated data.

Figure 3:
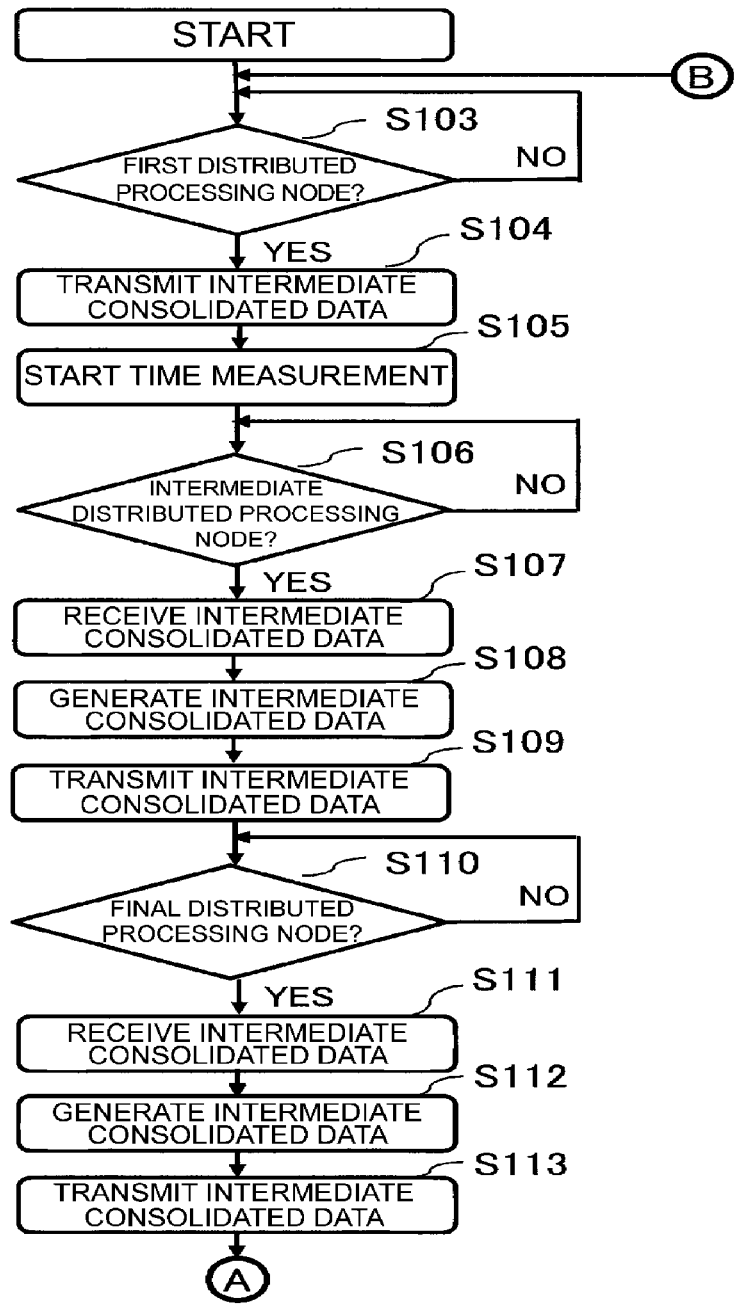
FIG. 3 is a flowchart illustrating an aggregation communication process, an inter-node consolidation process, and a dispatch communication process of the distributed processing node according to the first embodiment of the present invention.
Figure 4:
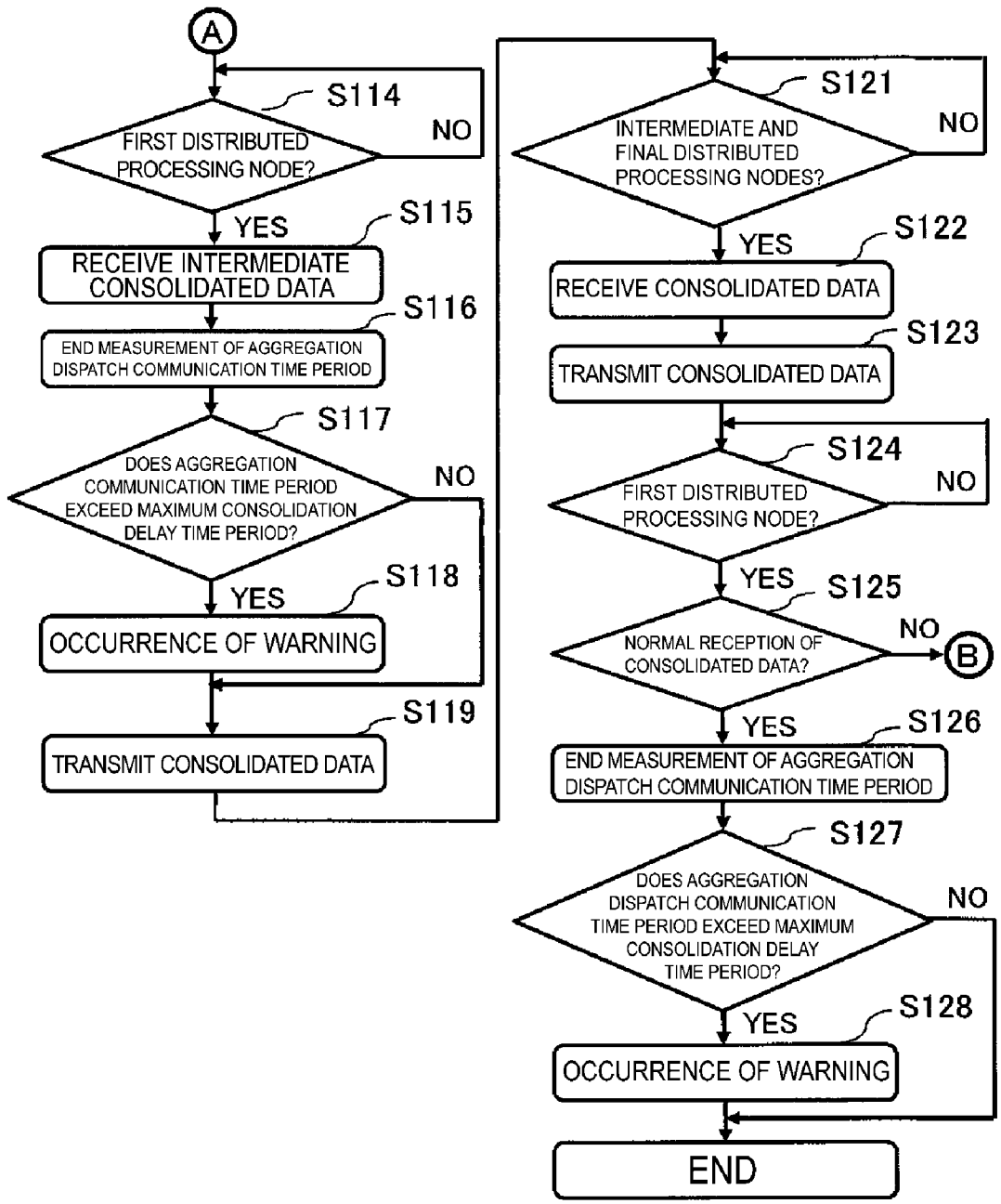
FIG. 4 is a flowchart illustrating the aggregation communication process, the inter-node consolidation process, and the dispatch communication process of the distributed processing node according to the first embodiment of the present invention.

FIG. 3 and FIG. 4 are each a flowchart illustrating an aggregation communication process, an inter-node consolidation process, and a dispatch communication process of the distributed processing node 1 [n].

First, the first distributed processing node 1 [1] consolidates M pieces of distributed data D [m, 1] (m=M) generated in the first distributed processing node 1 [1] into intermediate consolidated data Rt [m, 1], and transmits the intermediate consolidated data Rt [m, 1] to the distributed processing node 1 [2] assigned a succeeding number through the communication port 10 of the first distributed processing node 1 [1] and the communication path 2 [1] (steps S103 and S104 of FIG. 3). Specifically, the intermediate consolidated data Rt [m, 1] in this case is the same as the distributed data D [m, 1].

Equation 2

$$Rt[m,1]32D[m,1] \qquad (2)$$

Here, the first distributed processing node 1 [1] is a predetermined first distributed processing node out of the plurality of distributed processing nodes 1 [n] (n=1, ..., N).

Then, the first distributed processing node 1 [1] starts to measure an aggregation communication time period and an aggregation dispatch communication time period by using a consolidation delay timer to be described later (step S105 of FIG. 3). Here, the aggregation communication time period refers to a time period required for each distributed processing node 1 [n] to consolidate the distributed data D [m, n] (m=1, ..., M). Further, the aggregation dispatch communication time period refers to a time period required by each distributed processing node 1 [n] to dispatch the consolidated data in addition to the aggregation communication time period.

Next, an intermediate distributed processing node 1 [i] (i=2, ..., N−1) receives intermediate consolidated data Rt [m, i−1] (m=1, ..., M) from the distributed processing node 1 [i−1] through the communication port 11 of the intermediate distributed processing node 1 [i] (i=2, ..., N−1) and the communication path 2 [i−1] (steps S106 and S107 of FIG. 3). Here, the intermediate distributed processing node 1 [i] refers to a predetermined intermediate distributed processing node out of the plurality of distributed processing nodes 1 [n] (n=1, ..., N) except the first distributed processing node and the N-th distributed processing node.

The intermediate distributed processing node 1 [i] (i=2, ..., N−1) generates intermediate consolidated data Rt [m, i] by calculating the sum of the received intermediate consolidated data Rt [m, i−1] (m=1, ..., M) and distributed data D [m, 1] generated in the intermediate distributed processing node 1 [1] for each corresponding weight w [m] (step S108 of FIG. 3). Specifically, the intermediate consolidated data Rt [m, i] includes M numerical values. A calculation equation for the intermediate consolidated data Rt [m, i] is as follows.

Equation 3

$$Rt[m,i]=Rt[m,i-1]+D[m,i] \qquad (3)$$

Then, the intermediate distributed processing node 1 [i] (i=2, ..., N−1) transmits intermediate consolidated data Rt [m, i] (m=1, ..., M) generated in the intermediate distributed processing node 1 [i] to the distributed processing node 1 [i+1] assigned a succeeding number through the communication port 10 of the intermediate distributed processing node 1 [i] and the communication path 2 [i] (step S109 of FIG. 3).

A predetermined N-th distributed processing node 1 [N] out of the plurality of distributed processing nodes 1 [n] (n=1, ..., N) receives intermediate consolidated data Rt [m, N−1] from the distributed processing node 1 [N−1] through the communication port 11 of the predetermined N-th distributed processing node 1 [N] and the communication path 2 [N−1] (steps S110 and S111 of FIG. 3).

The N-th distributed processing node 1 [N] generates intermediate consolidated data Rt [m, N] by calculating the sum of the received intermediate consolidated data Rt [m, N−1] (m=1, ..., M) and distributed data D [m, N] generated in the N-th distributed processing node 1 for each corresponding weight w [m] (step S112 of FIG. 3). Specifically, the intermediate consolidated data Rt [m, N] includes M numerical values. A calculation equation for the intermediate consolidated data Rt [m, N] is as follows.

Equation 4

$$Rt[m,N]=Rt[m,N-1]+D[m,N] \qquad (4)$$

Then, the N-th distributed processing node 1 [N] transmits intermediate consolidated data Rt [m, N] (m=1, ..., M) generated in the N-th distributed processing node 1 to the first distributed processing node 1 [1] through the communication port 10 of the N-th distributed processing node 1 [N] and the communication path 2 [N] (step S113 of FIG. 3).

As described above, the intermediate consolidated data Rt [m, N] (m=1, ..., M) including M numerical values calculated according to Equation (2), Equation (3), and Equation (4) is calculated based on the distributed data D [m, n] (m=1, ..., M) including M numerical values generated in each distributed processing node 1 [n] (n=1, ..., N). A value of the intermediate consolidated data Rt [m, N] can be expressed by using the following equation.

Equation 5

$$Rt[m,N]=\Sigma_{n=1,\ldots,N}D[m,n] \qquad (5)$$

Next, with the intermediate consolidated data Rt [m, N] (m=1, ..., M) being used as consolidated data, dispatch communication of dispatching the consolidated data to each distributed processing node 1 [n] (n=1, ..., N) is performed.

The first distributed processing node 1 [1] receives the intermediate consolidated data Rt [m, N] from the distributed processing node 1 [N] through the communication port 11 of the first distributed processing node 1 [1] and the communication path 2 [N] (steps S114 and S115 of FIG. 4).

The first distributed processing node 1 [1] ends measuring the aggregation communication time period, using a time period from a time point at which time measurement is started in step S105 (time point at which the intermediate consolidated data Rt [m, 1] is transmitted) to a time point at which the intermediate consolidated data Rt [m, N] is received as the aggregation communication time period (step S116 of FIG. 4).

If the measured aggregation communication time period exceeds a predetermined maximum consolidation delay time period (YES in step S117 of FIG. 4), the first distributed processing node 1 [1] issues a warning indicating a consolidation delay anomaly to a system manager (step S118 of FIG. 4).

Next, the first distributed processing node 1 [1] consolidates the received intermediate consolidated data Rt [m, N] (m=1, ..., M) into consolidated data R [m], and transmits the consolidated data R [m] to the N-th distributed processing node 1 [N] through the communication port 11 of the first distributed processing node 1 [1] and the communication path 2 [N] (step S119 of FIG. 4). Specifically, the distributed processing node 1 [1] consolidates the intermediate consolidated data Rt [m, N] from the distributed processing node 1 [N] into the consolidated data R [m], and returns the consolidated data R [m] to the distributed processing node [N]. The consolidated data R [m] is the same as the intermediate consolidated data Rt [m, N].

Equation 6

$$R[m]=Rt[m,N]=\Sigma_{n=1,\ldots,N}D[m,n] \qquad (6)$$

Subsequently, the distributed processing node 1 [k] (k=N, . . . , 2) receives consolidated data R [m] (m=1, . . . , M) from the distributed processing node 1 [k$^+$] (k$^+$=k+1; note that k$^+$=1 if k=N) assigned a succeeding number through the communication port 10 of the distributed processing node 1 [k] and the communication path 2 [k] (steps S121 and S122 of FIG. 4). Here, the distributed processing node 1 [k] refers to a distributed processing node out of the plurality of distributed processing nodes 1 [n] (n=1, . . . , N) except the first distributed processing node.

Out of the distributed processing nodes 1 [n] (n=1, . . . , N), the distributed processing node 1 [k] (k=N, . . . , 2) except the first distributed processing node transmits the received consolidated data R [m] (m=1, . . . , M) to the distributed processing node 1 [k−1] assigned an immediately preceding number through the communication port 11 of the distributed processing node 1 [k] and the communication path 2 [k−1] (step S123 of FIG. 4).

The first distributed processing node 1 [1] receives the consolidated data R [m] (m=1, . . . , M) from the distributed processing node 1 [2] through the communication port 10 of the first distributed processing node 1 [1] and the communication path 2 [1] (steps S124 and S125 of FIG. 4).

Here, in order that the first distributed processing node 1 [1] normally receives the consolidated data R [m] including M numerical values, it is necessary that other distributed processing nodes 1 [k] (k=N, . . . , 2) normally receive the consolidated data R [m]. Each communication path 2 [n] (n=1, . . . , N) between the distributed processing nodes does not have a function of restoring abnormal consolidated data R [m] to normal consolidated data R [m].

Thus, if the distributed processing node 1 [1] normally receives the consolidated data R [m], it is ensured that all of the distributed processing nodes 1 [n] (n=1, . . . , N) have successfully received the consolidated data R [m]. If the distributed processing node 1 [1] fails to successfully receiving the consolidated data R [m] (NO in step S125), it is only necessary that the process return to step S103 and restart with the aggregation communication.

Note that whether the distributed processing node 1 [1] has successfully normally received the consolidated data R [m] can be judged by, for example, making a comparison between the consolidated data R [m] transmitted in step S119 and the consolidated data R [m] received in steps S124 and S125. Specifically, if the transmitted consolidated data R [m] and the received consolidated data R [m] match each other, it can be judged that the consolidated data R [m] has been successfully normally received.

Through the dispatch communication described above, all of the distributed processing nodes 1 [n] (n=1, . . . , N) can acquire the same consolidated data R [m].

Further, if the first distributed processing node 1 [1] successfully normally receives the consolidated data R [m], the first distributed processing node 1 [1] ends measuring the aggregation dispatch communication time period, using the time period from the time point at which the time measurement is started in step S105 (time point at which the intermediate consolidated data Rt [m, 1] is transmitted) to the time point at which the consolidated data R [m] is received as the aggregation dispatch communication time period (step S126 of FIG. 4).

If the measured aggregation dispatch communication time period exceeds the predetermined maximum consolidation delay time period (YES in step S127 of FIG. 4), the first distributed processing node 1 [1] issues a warning indicating a consolidation delay anomaly to the system manager (step S128 of FIG. 4).

The aggregation communication time period and the aggregation dispatch communication time period are increased when communication of the intermediate consolidated data is disconnected in the middle of the aggregation communication or when communication of the consolidated data is disconnected in the middle of the dispatch communication. If the aggregation communication time period exceeds a maximum consolidation delay time period or if the aggregation dispatch communication time period exceeds a maximum consolidation delay time period, anomaly of the distributed processing system is reported to the system manager by the distributed processing node [1] issuing a warning indicating the consolidation delay anomaly. In this manner, the system manager can be prompted to cope with and solve the consolidation delay anomaly.

The aggregation communication is performed in the following route: the distributed processing node 1 [1]→the distributed processing node 1 [2]→ . . . → the distributed processing node 1 [N]→the distributed processing node 1 [1]. The dispatch communication is performed in the following route: the distributed processing node 1 [1]→the distributed processing node 1 [N]→ . . . → the distributed processing node 1 [2]→the distributed processing node 1 [1].

Specifically, directions of communications of the aggregation communication and the dispatch communication are opposite to each other. The aggregation communication and the dispatch communication are performed via the communication ports 10 and 11 capable of simultaneous bidirectional communication and the communication paths 2 [n], and thus there is no need to wait for the start of the dispatch communication until the aggregation communication is completed.

Specifically, when the distributed processing node 1 [1] starts receiving the intermediate consolidated data Rt [m, N] before the distributed processing node 1 [1] completes transmission of the intermediate consolidated data Rt [m, 1] (m=1, . . . , M), the dispatch communication can be started with the intermediate consolidated data Rt [m, N] being used as the consolidated data R [m].

Figure 5:
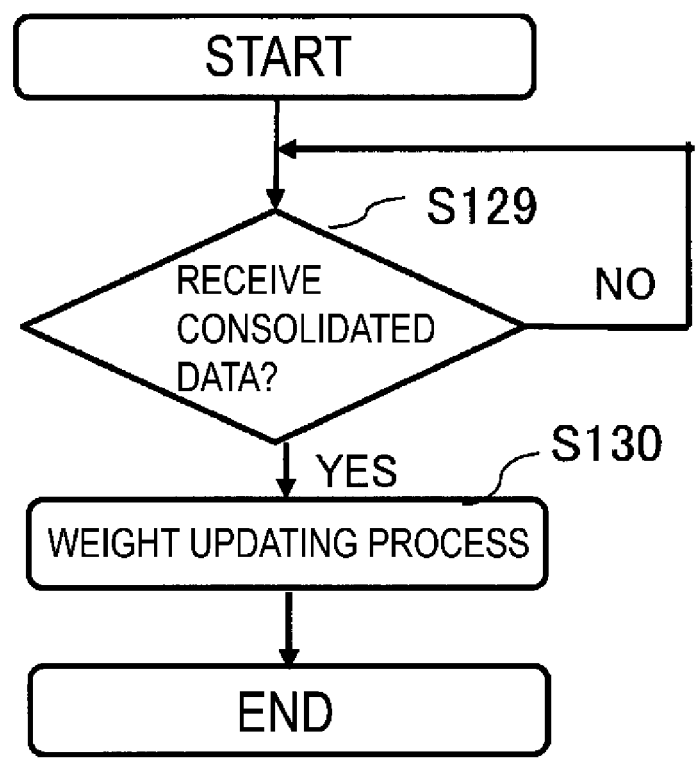
FIG. 5 is a flowchart illustrating a weight updating process of the distributed processing node according to the first embodiment of the present invention.

FIG. 5 is a flowchart illustrating a weight updating process of the distributed processing node 1 [n] (n=1, . . . , N). When each distributed processing node 1 [n] receives the consolidated data R [m] (m=1, . . . , M) (YES in step S129 of FIG. 5), the distributed processing node 1 [n] performs a weight updating process of updating the weight w [m] of the neural network in the distributed processing node 1 [n], based on the received consolidated data R [m] (step S130 of FIG. 5). In the weight updating process, it is only necessary to update the weight w [m] for each number m so that the loss function has a minimum value, based on the gradient of the loss function indicated by the consolidated data R [m]. The update of the weight w [m] is a known technology, and thus detailed description thereof will be omitted herein.

As described above, the weight updating process is a process of updating the weight w [m], based on the pieces of consolidated data R [m] acquired in the order of the numbers m of the weights w [m]. Thus, each distributed processing node 1 [n] (n=1, . . . , N) can perform the weight updating process for the weight w [m] in the order of the numbers m.

With the end of the weight updating process, one mini batch learning ends, and each distributed processing node 1 [n] (n=1, . . . , N) continues to perform the processing of the next mini batch learning, based on the updated weight w [m]. Specifically, each distributed processing node 1 [n] receives sample data for the next mini batch learning from a data collection node (not illustrated) and repeats the processing of the mini batch learning described in the above, thereby enhancing accuracy of inference of the neural network of the distributed processing node 1 [n].

As illustrated in the present embodiment, there is no need to wait for the start of the dispatch communication until the aggregation communication is completed, and even in the middle of the aggregation communication, the dispatch communication can be started from a part of the pieces of data that has been consolidated. Thus, as compared to the conventional technology in which the dispatch communication is started after the aggregation communication is completed, a time period from the start of the aggregation communication to the completion of the dispatch communication can be reduced. Accordingly, a distribution system for deep learning of a higher speed can be provided.

Further, in the present embodiment, it is ensured that other distributed processing nodes 1 [k] (k=2, . . . , N) have completed acquiring the consolidated data R [m] at the time point when the distributed processing node 1 [1] completes acquisition of the consolidated data R [m]. Accordingly, a distributed processing system for deep learning of high reliability can be provided.

In addition, in the present embodiment, when the aggregation communication time period exceeds a maximum consolidation delay time period or when the aggregation dispatch communication time period exceeds a maximum consolidation delay time period, the distributed processing node [1] issues a warning indicating a consolidation delay anomaly. In this manner, a distributed processing system for deep learning with excellent maintainability that is capable of immediately detecting an anomaly of disconnection of communication in the middle of the aggregation communication and the dispatch communication can be provided.

Second Embodiment

Figure 6:
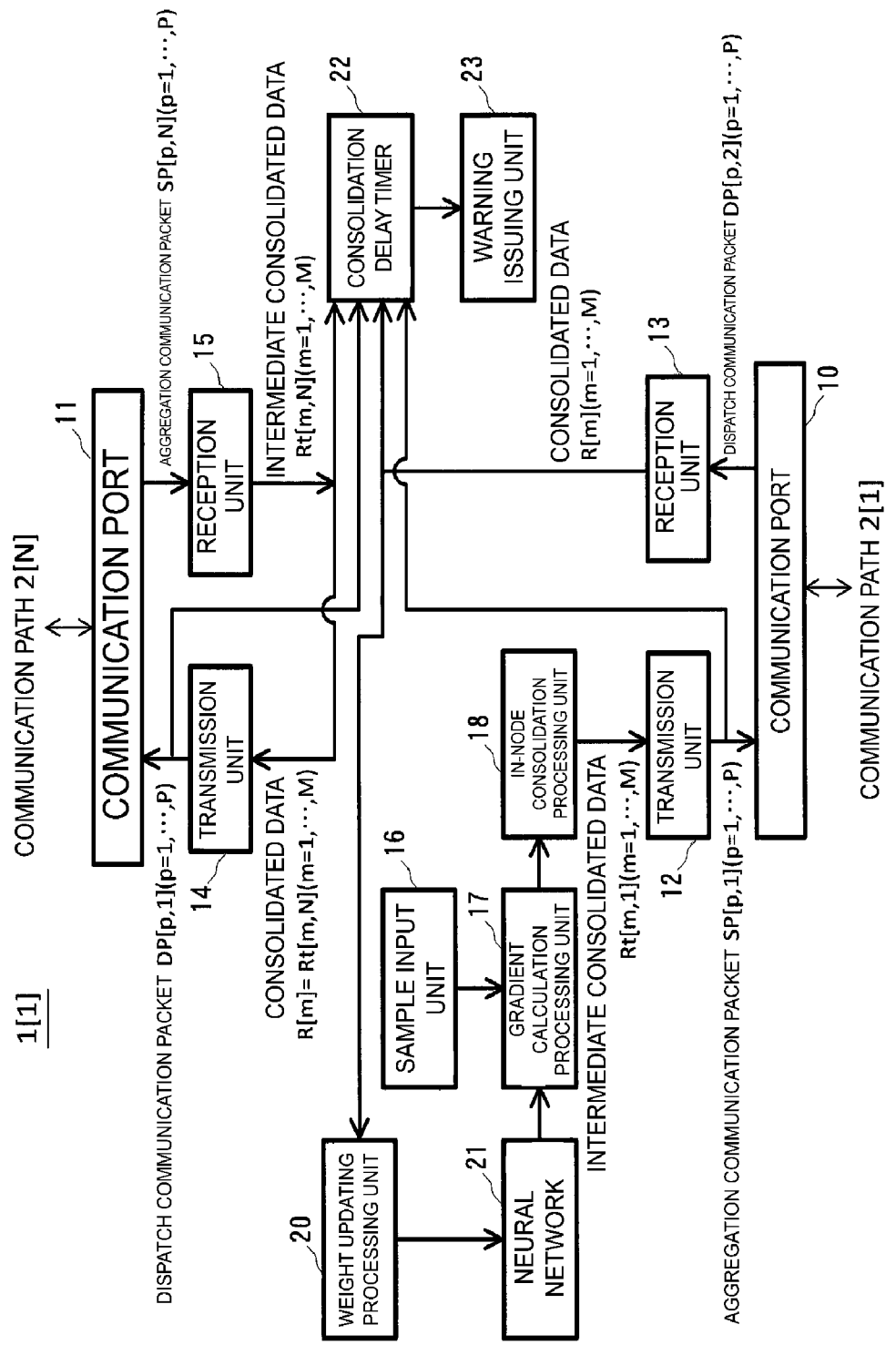
FIG. 6 is a block diagram illustrating a configuration example of the distributed processing node according to a second embodiment of the present invention.
Figure 7:
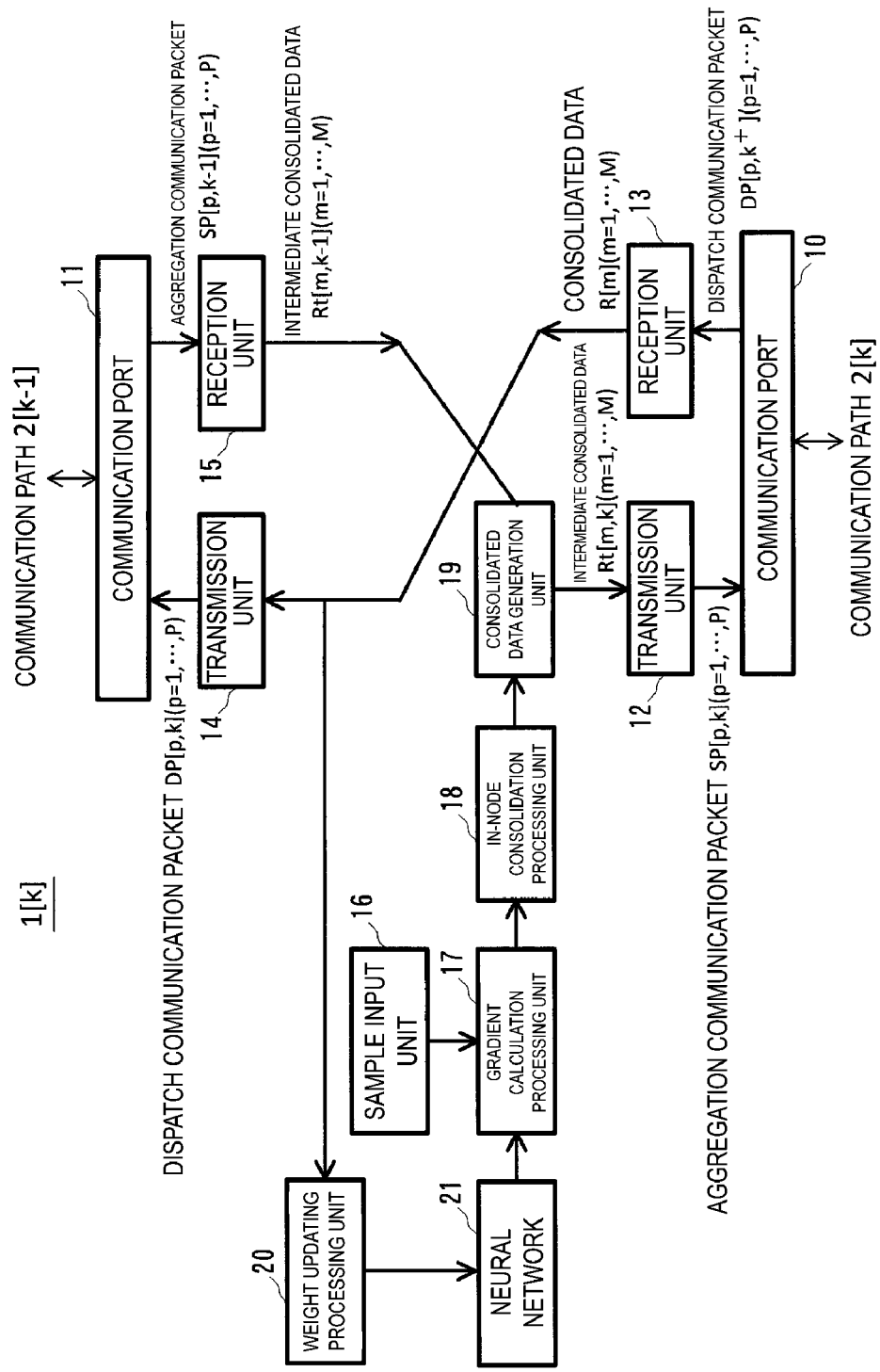
FIG. 7 is a block diagram illustrating a configuration example of the distributed processing node according to the second embodiment of the present invention.

Next, a second embodiment of the present invention will be described. The present embodiment describes the first embodiment in more detail. FIG. 6 is a block diagram illustrating a configuration example of the distributed processing node 1 [1] according to the present embodiment, and FIG. 7 is a block diagram illustrating a configuration example of the distributed processing node 1 [k] (k=2, . . . , N) according to the present embodiment.

The distributed processing node 1 [1] includes a communication port 10 (first communication port), a communication port 11 (second communication port), a transmission unit 12 (first transmission unit), a reception unit 13 (second reception unit), a transmission unit 14 (second transmission unit), a reception unit 15 (first reception unit), a sample input unit 16, a gradient calculation processing unit 17, an in-node consolidation processing unit 18, a weight updating processing unit 20, a neural network 21, a consolidation delay timer 22, and a warning issuing unit 23. Here, the transmission unit 12 packetizes the intermediate consolidated data Rt [m, 1] (m=1, . . . , M) and outputs the packetized intermediate consolidated data Rt [m, 1] to the communication port 10 of the distributed processing node 1 [1]. Further, the reception unit 13 acquires the consolidated data R [m] from the packets received from the communication port 10 of the distributed processing node 1 [1]. Further, the transmission unit 14 packetizes the consolidated data R [m] and outputs the packetized consolidated data R [m] to the communication port 11 of the distributed processing node 1 [1]. Further, the reception unit 15 acquires the intermediate consolidated data Rt [m, N] (m=1, . . . , M) from the packets received from the communication port 11 of the distributed processing node 1 [1]. Further, the sample input unit 16 receives the sample data for learning from the data collection node (not illustrated). Further, when the sample data is input, the gradient calculation processing unit 17 calculates a gradient G [m, 1, s] of the loss function of the neural network for each piece of the sample data, for each of the weights w [m] of the neural network. Further, the in-node consolidation processing unit 18 generates the distributed data D [m, 1] being a numerical value obtained by consolidating the gradients G [m, n, s] of each piece of the sample data for each of the weights w [m], and stores the generated distributed data D [m, 1]. Further, the weight updating processing unit 20 updates the weights of the neural network, based on the consolidated data R [m]. Further, the neural network 21 is a mathematical model constructed as a piece of software. Further, the consolidation delay timer 22 measures the aggregation communication time period and the aggregation dispatch communication time period. Further, the warning issuing unit 23 issues a warning indicating a consolidation delay anomaly when the aggregation communication time period or the aggregation dispatch communication time period exceeds a maximum consolidation delay time period.

The distributed processing node 1 [k] (k=2, . . . , N) includes a communication port 10 (first communication port), a communication port 11 (second communication port), a transmission unit 12 (first transmission unit), a reception unit 13 (second reception unit), a transmission unit 14 (second transmission unit), a reception unit 15 (first reception unit), a sample input unit 16, a gradient calculation processing unit 17, an in-node consolidation processing unit 18, a consolidated data generation unit 19, a weight updating processing unit 20, and a neural network 21. Here, the transmission unit 12 packetizes the intermediate consolidated data Rt [m, k] (m=1, . . . , M) and outputs the packetized intermediate consolidated data Rt [m, k] to the communication port 10 of the distributed processing node 1 [k]. Further, the reception unit 13 acquires the consolidated data R [m] from the packets received from the communication port 10 of the distributed processing node 1 [k]. Further, the transmission unit 14 packetizes the consolidated data R [m] and outputs the packetized consolidated data R [m] to the communication port 11 of the distributed processing node 1 [k]. Further, the reception unit 15 acquires the intermediate consolidated data Rt [m, k−1] (m=1, . . . , M) from the packets received from the communication port 11 of the distributed processing node 1 [k]. Further, when the sample data is input, the gradient calculation processing unit 17 calculates a gradient G [m, k, s] of the loss function of the neural network for each piece of the sample data, for each of the weights w [m] of the neural network. Further, the in-node consolidation processing unit 18 generates the distributed data D [rn, k] being a numerical value obtained by consolidating the gradients G [m, k, s] of each piece of the sample data for each of the weights w [m], and stores the generated distributed data D [m, k]. Further, the consolidated data generation unit 19 generates the intermediate consolidated data Rt [m, k] after update by calculating the sum of the received intermediate consolidated data Rt [m, k-1] (m=1, . . . , M) and the distributed data D [m, k] generated in the distributed processing node 1 [k] for each corresponding weight w [m].

Note that the distributed processing node 1 [1] and the distributed processing node 1 [k] (k=2, . . . , N) can be implemented in the same hardware as will be described later. Specifically, with initial settings performed from the outside, the function of each distributed processing node can be designated for any of a parent node (distributed processing node 1 [1]) and a child node (distributed processing node 1 [k]). Owing to this configuration, in embodiments of the present invention, all of the distributed processing nodes can be implemented at low costs.

As has been described in step S100 of FIG. 2, the sample input unit 16 of each distributed processing node 1 [n] (n=1, . . . , N) inputs sample data x [n, s] (s=1, . . . , S) from the data collection node for each mini batch.

As has been described in step S101 of FIG. 2, when the sample data x [n, s] is input, the gradient calculation processing unit 17 of each distributed processing node 1 [n] (n=1, . . . , N) performs calculation as follows. The above description "to perform calculation as follows" means to perform calculation of the gradient G [m, n, s] of the loss function of the neural network 21 for each piece of the sample data x [n, s], for each of M weights w [m] (m=1, . . . , M) of the neural network 21.

As has been described in step S102 of FIG. 2, the in-node consolidation processing unit 18 of each distributed processing node 1 [n] (n=1, . . . , N) generates the distributed data D [m, n] (m=1, . . . , M) being a numerical value obtained by consolidating the gradients G [rn, n, s] of each piece of the sample data for each of the weights w [m], and stores the generated distributed data D [m, n].

Next, with the initial settings performed from the outside, the transmission unit 12 of each distributed processing node 1 [n] (n=1, . . . , N) is capable of setting as to whether the transmission unit 12 operates as a transmission unit for the parent node (distributed processing node 1 [1]) or as a transmission unit for the child node (distributed processing node 1 [k], k=2, . . . , N).

The transmission unit 12 of the distributed processing node 1 [1] being set as the parent node uses M pieces of distributed data D [m, 1] (m=1, . . . , M) generated by the in-node consolidation processing unit 18 of the distributed processing node 1 [1] as the intermediate consolidated data Rt [m, 1]. Then, the transmission unit 12 packetizes the intermediate consolidated data Rt [m, 1] in the order of the numbers m of the weights w [m], and outputs such generated aggregation communication packets SP [p, 1] (p=1, . . . , P, P is an integer of 2 or greater) to the communication port 10 of the distributed processing node 1 [1]. The aggregation communication packets SP [p, 1] are transmitted from the communication port 10 to the distributed processing node 1 [2] assigned a succeeding number via the communication path 2 [1] (steps S103 and S104 of FIG. 3).

The consolidation delay timer 22 of the distributed processing node 1 [1] starts measuring the aggregation communication time period (step S105 of FIG. 3).

On the other hand, the reception unit 15 of each distributed processing node 1 [k] (k=2, . . . , N) being set as the child node receives the aggregation communication packets SP [p, k-1] (p=1, . . . , P) from the distributed processing node 1 [k-1] via the communication port 11 of the distributed processing node 1 [k] and the communication path 2 [k-1]. Then, the reception unit 15 acquires the intermediate consolidated data Rt [m, k-1] (m=M) from the received aggregation communication packets SP [p, k-1] (steps S106, S107, S110, and S111 of FIG. 3).

The consolidated data generation unit 19 of each distributed processing node 1 [k] (k=2, . . . , N) being set as the child node calculates the sum of the intermediate consolidated data Rt [m, k-1] (m=1, . . . , M) acquired by the reception unit 15 of the distributed processing node [k] and the distributed data D [m, k] for each corresponding weight w [m] (for each number m). In this manner, the consolidated data generation unit 19 generates the intermediate consolidated data Rt [m, k] in the order of the numbers m (steps S108 and S112 of FIG. 3). Here, the distributed data D [m, k] is generated by the in-node consolidation processing unit 18 of the distributed processing node 1 [k].

Then, the transmission unit 12 of each distributed processing node 1 [k] (k=2, N) packetizes M pieces of the intermediate consolidated data Rt [m, k] (m=M) generated by the consolidated data generation unit 19 of the distributed processing node 1 [k] in the order of the numbers m of the weights w [m], and outputs the generated aggregation communication packets SP [p, k] (p=1, . . . , P) to the communication port 10 of the distributed processing node 1 [k]. The aggregation communication packets SP [p, k] are transmitted from the communication port 10 to the distributed processing node 1 [k$^+$] (k$^+$=k+1; note that k$^+$=1 if k=N) assigned a succeeding number via the communication path 2 [k] (steps S109 and S113 of FIG. 3).

Next, in a similar manner to the transmission unit 12, with the initial settings performed from the outside, the transmission unit 14 of each distributed processing node 1 [n] (n=1, . . . , N) is capable of setting as to whether the transmission unit 14 operates as a transmission unit for the parent node (distributed processing node 1 [1]) or as a transmission unit for the child node (distributed processing node 1 [k], k=2, . . . , N).

The reception unit 15 of the distributed processing node 1 [1] being set as the parent node receives the aggregation communication packets SP [p, N] from the distributed processing node 1 [N] via the communication port 11 of the distributed processing node 1 [1] and the communication path 2 [N]. Then, the reception unit 15 acquires the intermediate consolidated data Rt [m, N] (m=1, . . . , M) from the received aggregation communication packets SP [p, N] (p=1, . . . , P) (steps S114 and S115 of FIG. 4).

The consolidation delay timer 22 of the distributed processing node 1 [1] being set as the parent node ends measuring the aggregation communication time period (step S116 of FIG. 4).

If the aggregation communication time period measured by the consolidation delay timer 22 exceeds a predetermined maximum consolidation delay time period (YES in step S117 of FIG. 4), the warning issuing unit 23 of the distributed processing node 1 [1] issues a warning to the system manager (step S118 of FIG. 4). Examples of a method of outputting the warning include, for example, a method of transmitting a signal for reporting occurrence of a warning to a terminal apparatus of the system manager.

The transmission unit 14 of the distributed processing node 1 [1] being set as the parent node uses the intermediate consolidated data Rt [m, N] (m=1, . . . , M) acquired by the reception unit 15 of the distributed processing node 1 [1] as the consolidated data R [m]. Then, the transmission unit 14 packetizes the consolidated data R [m] in the order of the numbers m of the weights w [m], and outputs such generated dispatch communication packets DP [p, 1] (p=1, . . . , P) to the communication port 11 of the distributed processing node 1 [1]. The dispatch communication packets DP [p, 1] are transmitted from the communication port 11 to the N-th distributed processing node 1 [N] via the communication path 2 [N] (step S119 of FIG. 4).

On the other hand, the reception unit 13 of each distributed processing node 1 [k] (k=2, ..., N) being set as the child node receives the dispatch communication packets DP [p, k$^+$] (p=1, ..., P) from the distributed processing node 1 [k$^+$] (k$^+$=k+1; note that k$^+$=1 if k=N) to the communication port 10 of the distributed processing node 1 [k] and the communication path 2 [k]. Then, the reception unit 13 acquires the consolidated data R [m] (m=1, ..., M) from the received dispatch communication packets DP [p, k+] (steps S121 and S122 of FIG. 4).

The transmission unit 14 of each distributed processing node 1 [k] (k=2, ..., N) being set as the child node packetizes the consolidated data R [m] (m=1, ..., M) acquired by the reception unit 13 in the order of the numbers m of the weights w [m], and outputs the generated dispatch communication packets DP [p, k] (p=1, ..., P) to the communication port 11 of the distributed processing node 1 [k]. The dispatch communication packets DP [p, k] are transmitted from the communication port 11 to the distributed processing node 1 [k−1] via the communication path 2 [k−1] (step S123 of FIG. 4).

The reception unit 13 of the distributed processing node 1 [1] being set as the parent node receives the dispatch communication packets DP [p, 2] (p=1, ..., P) from the distributed processing node 1 [2] via the communication port 10 of the distributed processing node 1 [1] and the communication path 2 [1]. Then, the reception unit 13 acquires the consolidated data R [m] (m=1, ..., M) from the received dispatch communication packets DP [p, 2] (steps S124 and S125 of FIG. 4).

The consolidation delay timer 22 of the distributed processing node 1 [1] being set as the parent node ends measuring the aggregation dispatch communication time period (step S126 of FIG. 4).

If the aggregation dispatch communication time period measured by the consolidation delay timer 22 exceeds a predetermined maximum consolidation delay time period (YES in step S127 of FIG. 4), the warning issuing unit 23 of the distributed processing node 1 [1] issues a warning to the system manager (step S128 of FIG. 4).

Note that the transmission unit 12 of each distributed processing node 1 [n] (n=1, ..., N) divides the M pieces of the intermediate consolidated data Rt [m, n] into P (P is an integer of 2 or greater) aggregation communication packets for a set of L (L is an integer of 1 or greater and M or less) pieces in the order of the numbers m of the weights w [m]. Then, the transmission unit 12 sequentially transmits the P aggregation communication packets to the distributed processing node 1 [n$^+$] (n$^+$=n+1; note that n$^+$=1 if n=N) assigned a succeeding number until transmission of all of the aggregation communication packets ends. Specifically, the aggregation communication packet SP [p, n] transmitted in the p-th (p=1, ..., P) place stores L pieces of the intermediate consolidated data Rt [r, n] (r=L×(p−1)+l, l=1, ..., L).

If M cannot be divided by L, the P-th aggregation communication packet SP [P, n] stores (M−L×(P−1)) pieces of the intermediate consolidated data Rt [r, n] (r=L×(P−1)+q, q=1, ..., M−L×(P−1)).

Regarding the P-th aggregation communication packet SP [P, n], {L−(M−L×(P−1))} dummy numerical values may be added after the (M−L×(P−1)) pieces of the intermediate consolidated data Rt [r, n] so that all of the aggregation communication packets equally store L pieces of data.

Further, the transmission unit 14 of each distributed processing node 1 [n] (n=1, ..., N) divides the M pieces of the consolidated data R [m] (m=1, ..., M) into P dispatch communication packets for a set of L pieces in the order of the numbers m of the weights w [m]. Then, the transmission unit 14 sequentially transmits the P dispatch communication packets to the distributed processing node 1 [n$^-$] (n$^-$=n−1; note that n$^-$=N if n=1) until transmission of all of the dispatch communication packets ends. Specifically, the dispatch communication packet DP [p, n] transmitted in the p-th (p=1, ..., P) place stores L pieces of the consolidated data R[r] (r=L×(p−1)+l, l=1, ..., L).

If M cannot be divided by L, the P-th dispatch communication packet DP [p, n] stores (M−L×(P−1)) pieces of the consolidated data R [r] (r=L×(P−1)+q, q=M−L×(P−1)).

Regarding the P-th dispatch communication packet DP [P, n], {L−(M−L×(P−1))} dummy numerical values may be added after the (M−L×(P−1)) pieces of the consolidated data R [r] so that all of the dispatch communication packets equally store L pieces of data.

The weight updating processing unit 20 of each distributed processing node 1 [n] (n=1, ..., N) performs the weight updating process of updating the weights w [m] of the neural network 21 in the distributed processing node 1 [n], based on the consolidated data R [m] acquired by the reception unit 13 of the distributed processing node 1 [n] (step S130 of FIG. 5).

Figure 8:
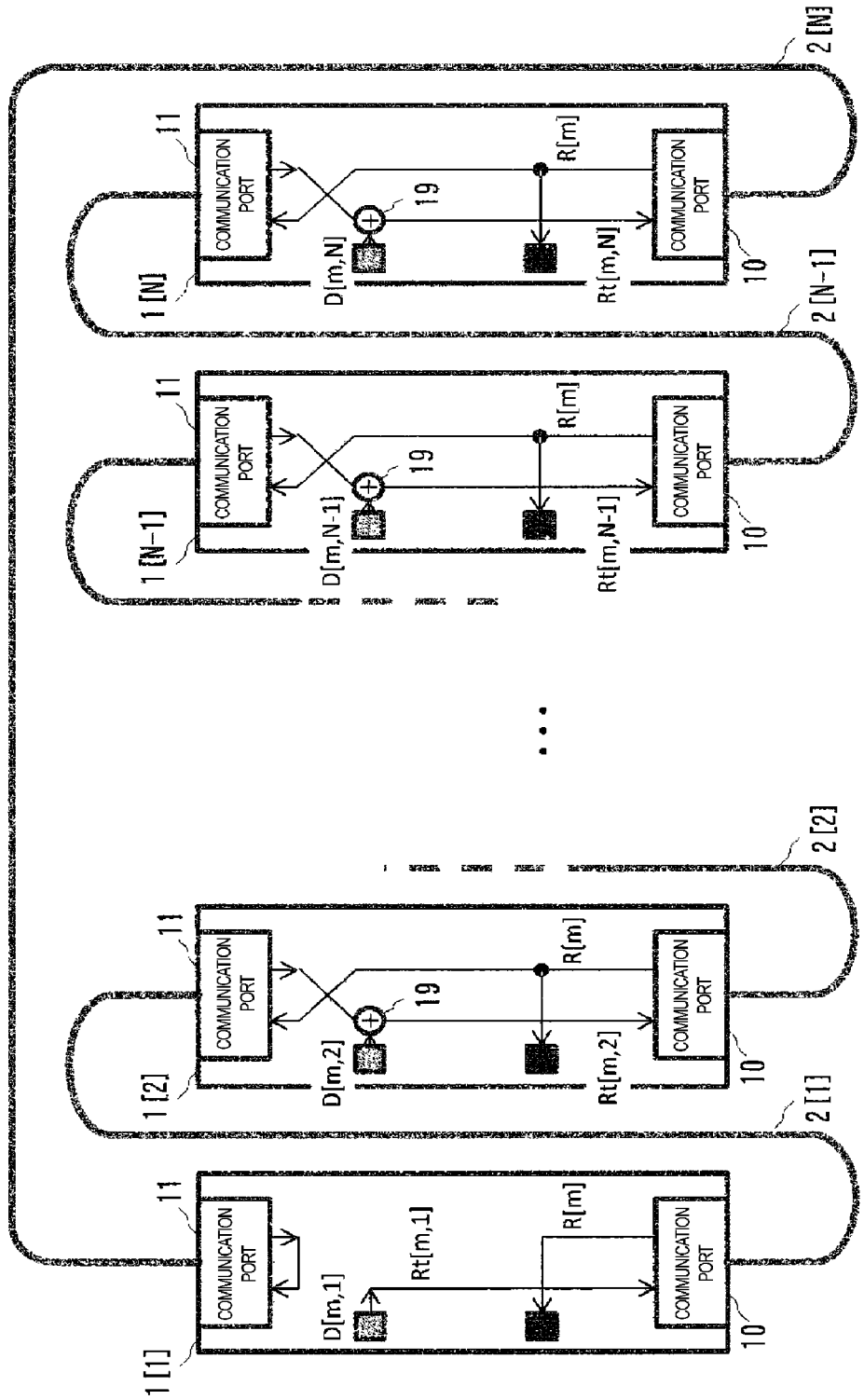
FIG. 8 is a diagram illustrating an outline of processing of the distributed processing node according to the second embodiment of the present invention.
Figure 9:
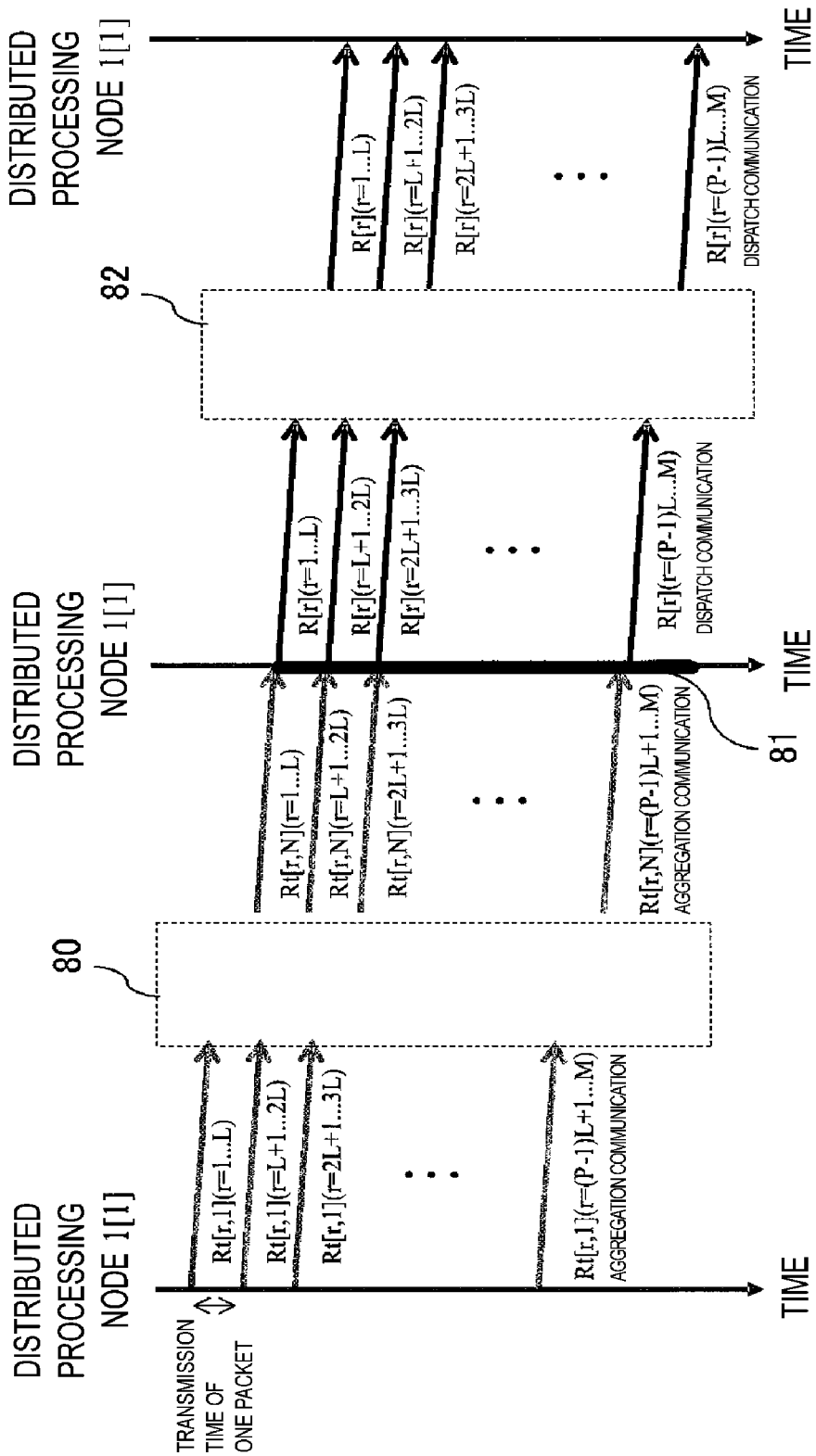
FIG. 9 is a diagram illustrating a sequence of communication of intermediate consolidated data and consolidated data between the distributed processing nodes according to the second embodiment of the present invention.
Figure 10:
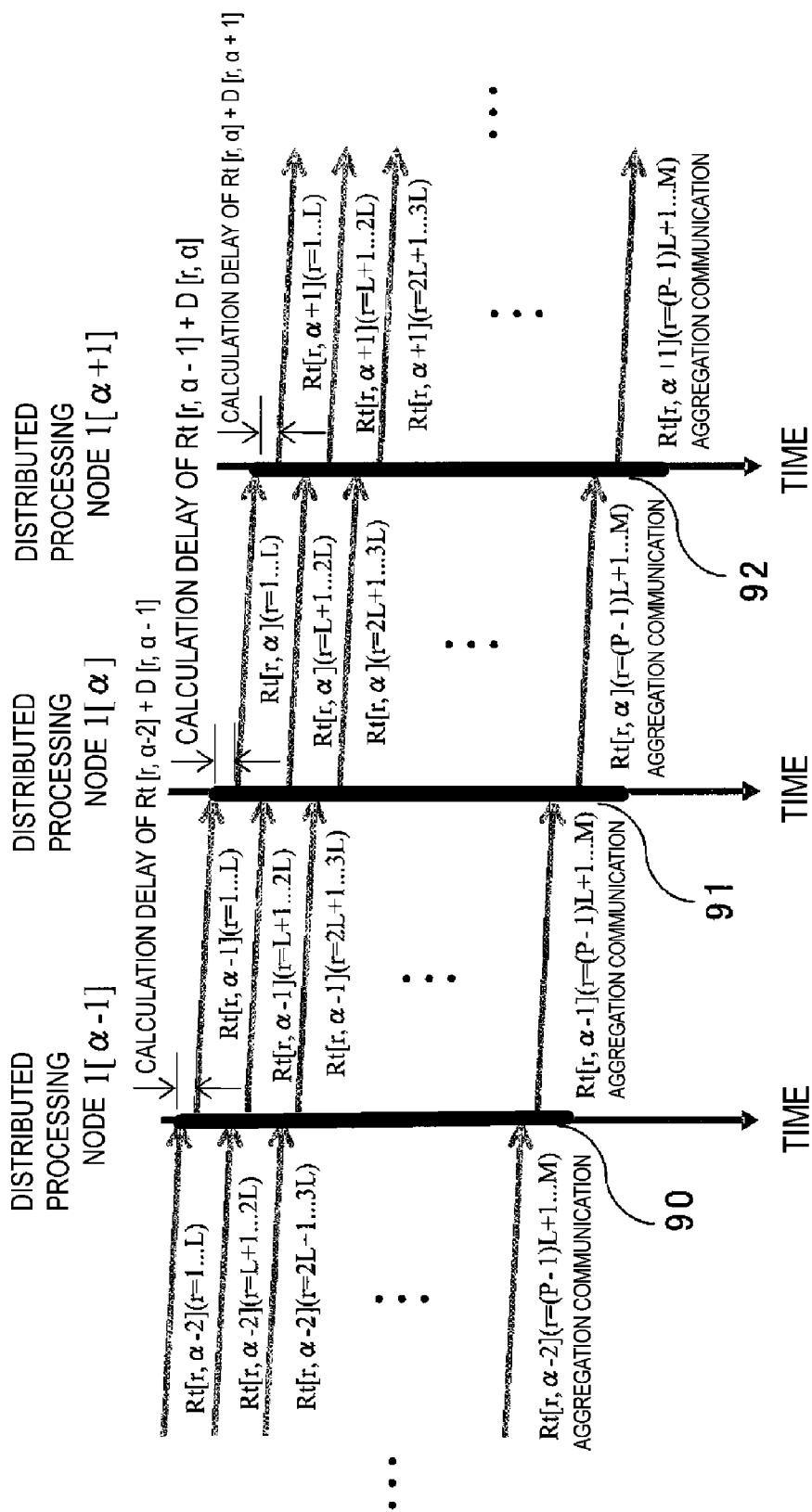
FIG. 10 is a diagram illustrating a sequence of communication of intermediate consolidated data and consolidated data between the distributed processing nodes according to the second embodiment of the present invention.
Figure 11:
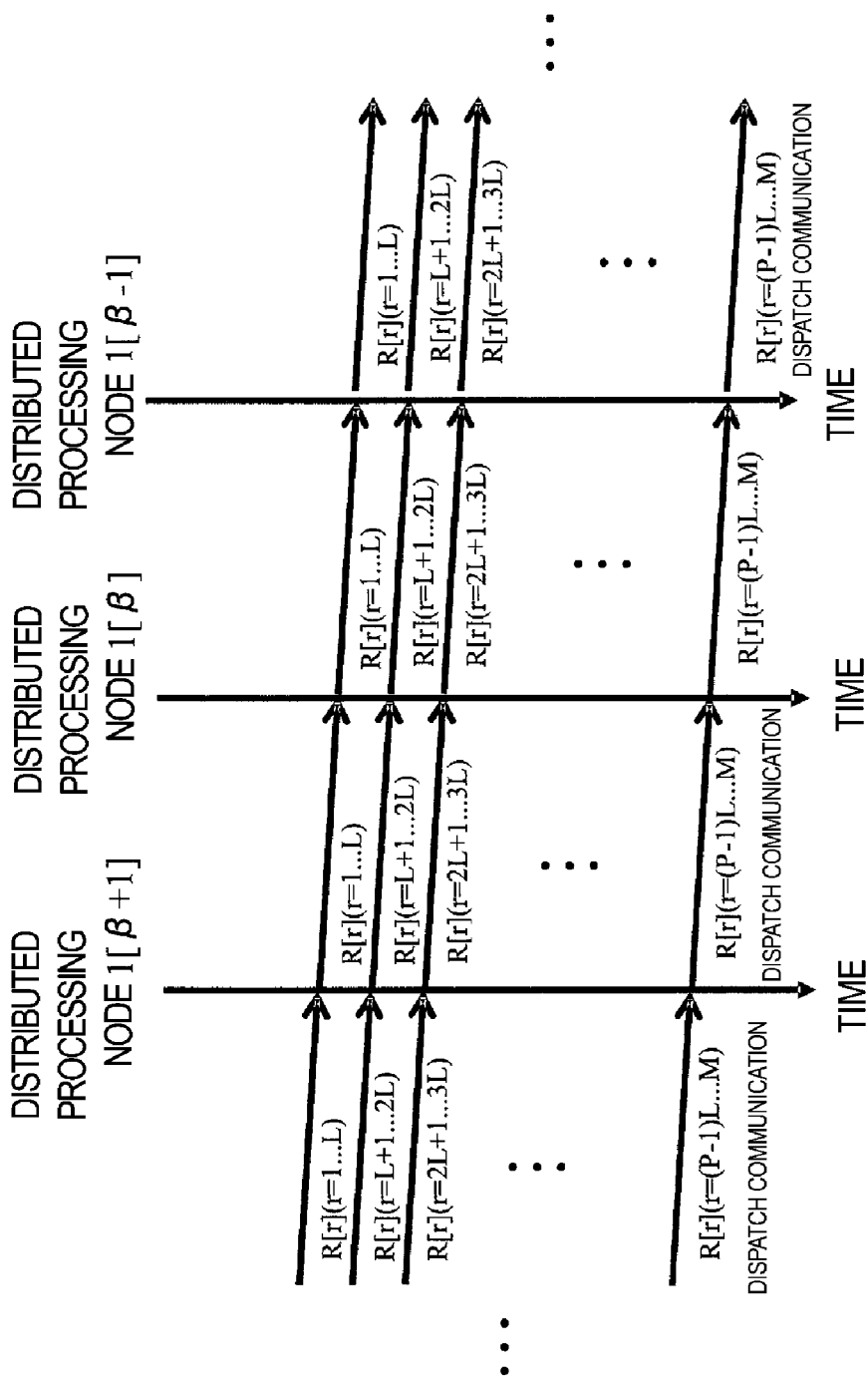
FIG. 11 is a diagram illustrating a sequence of communication of intermediate consolidated data and consolidated data between the distributed processing nodes according to the second embodiment of the present invention.

FIG. 8 illustrates an outline of processing of each distributed processing node 1 [n] (n=1, ..., N). FIG. 9 to FIG. 11 each illustrate a sequence of communication (the aggregation communication and the dispatch communication) of the intermediate consolidated data and the consolidated data between the distributed processing nodes 1 [n] (n=1, ..., N).

Note that FIG. 10 illustrates processing of a part 80 of FIG. 9. Further, part 81 illustrates the inter-node consolidation process of the distributed processing node 1 [1]. In a similar manner, reference numerals 90, 91, and 92 FIG. 10 illustrate the inter-node consolidation process of the distributed processing nodes 1 [α−1], 1 [α], 1 and [α+1] (α=3, ..., N−1), respectively. FIG. 11 illustrates processing of a part 82 of FIG. 9, that is, the dispatch communication process of the distributed processing nodes 1 [β+1],1 [β],1 and [β−1] (β=N−1, ..., 3).

[011s] As described above, all of the aggregation communication, the inter-node consolidation process, and the dispatch communication are performed in the order of the numbers m of the weights w [m], and are capable of being formed into a pipeline with the unit of the number m. Here, the aggregation communication refers to the aggregation communication from the distributed processing node 1 [n] (n=1, ..., N) with the start point and the end point being the distributed processing node 1 [1] to the distributed processing node [n$^+$] (n$^+$=n+1; note that n$^+$=1 if n=N) (a process of transmitting the intermediate consolidated data Rt [m, n] to the distributed processing node [n$^+$]). Further, the inter-node consolidation process refers to the inter-node consolidation process performed by the distributed processing node 1 [k] (k=2, ..., N) (a process of calculating the intermediate consolidated data Rt [m, k], based on the received intermediate consolidated data Rt [m, k−1] and the distributed data D [m, k] generated in the distributed processing node 1 [k]). Further, the dispatch communication refers to the dispatch communication from the distributed processing node 1 [n] (n=1, ..., N) with the start point and the end point being the distributed processing node 1 [1] to the distributed processing node 1 [n⁻] (n⁻=n−1; note that n⁻=N if n=1) (a process of dispatching the consolidated data R [m] to each distributed processing node 1 [n⁻]).

In the present embodiment, as illustrated in FIG. 9 to FIG. 11, the aggregation communication process, the inter-node consolidation process, and the dispatch communication process can be performed in parallel substantially simultaneously (pipeline processing with the unit of the number m), which can significantly reduce a processing time period as compared to the conventional technology in which the next processing cannot be started until each communication and each processing ends.

Third Embodiment

In the first and second embodiments, when the aggregation communication time period exceeds a maximum consolidation delay time period or when the dispatch communication time period exceeds a maximum consolidation delay time period, the distributed processing node 1 [1] issues a warning indicating a consolidation delay anomaly. In contrast, the present embodiment is an example in which an anomaly of the distributed processing system of disconnection of communication in the middle of the aggregation communication and the dispatch communication can be detected in a shorter period of time by reducing a value of the maximum consolidation delay time period.

First, in the present embodiment, a reason why the value of the maximum consolidation delay time period can be reduced will be described below.

In the first and second embodiments, the value of the maximum consolidation delay time period needs to be a value to which a variation of the following time is added in the following time period from the following state. Here, the following state refers to a state in which all of the distributed processing nodes 1 [n] (n=1, . . . , N) have completed preparation for consolidating the distributed data D [m, n] (m=1, . . . , M). Further, the following time period refers to a time period from the time point at which the distributed processing node 1 [1] starts the aggregation communication to a time point at which the distributed processing node 1 [1] completes the dispatch communication. Further, the following time refers to a time at which preparation for consolidating the distributed data D [m, n] in each distributed processing node 1 [n] is completed.

Specifically, after the last dispatch communication is completed, preparation for starting the aggregation communication (preparation for consolidating the distributed data D [m, n] (m=1, . . . , M)) is performed. Here, the aggregation communication includes the weight updating process performed by the weight updating processing unit 20, the gradient calculation process performed by the gradient calculation processing unit 17, and the in-node consolidation process performed by the in-node consolidation processing unit 18. An aggregation communication preparation time period that is required for the preparation varies between T1 to T2 because of variation of calculation speeds due to differences between each individual distributed processing node 1 [n] (basic performance, cooling performance, and the like).

Suppose the aggregation communication preparation time period of the distributed processing node 1 [1] has a value T1, and the aggregation communication preparation time period of the distributed processing node 1 [2] that completes the dispatch communication at substantially the same time as the distributed processing node 1 [1] has a value T2. In this case, even if the distributed processing node 1 [1] completes generating the distributed data D [m, 1] (m=1, . . . , M) and starts the aggregation communication after T1 since the completion of the last dispatch communication, the distributed processing node 1 [2] that receives the intermediate consolidated data Rt [m, 1] from the distributed processing node 1 [1] does not complete generation of the distributed data D [m, 2] until a (T2−T1) time period passes. For this reason, the distributed processing node 1 [2] cannot start the aggregation communication (transmission of the intermediate consolidated data Rt [m, 2]) to the distributed processing node 1 [3].

Thus, even if the distributed processing system is normal, a delay of the (T2−T1) time period, which is a variation of the aggregation communication preparation time period, may be generated. In view of this, in the first and second embodiments, as a countermeasure for not judging that the delay is an anomaly, the value of the maximum consolidation delay time period needs to be a value to which a variation (T2−T1) of the following time is added in the following time period from the following state. Here, the following state refers to a state in which all of the distributed processing nodes 1 [n] (n=1, . . . , N) have completed preparation of consolidating the distributed data D [m, n] (m=1, . . . , M). Further, the following time period refers to a time period from the time point at which the distributed processing node 1 [1] starts the aggregation communication to a time point at which the distributed processing node 1 [1] completes the dispatch communication. Further, the following time refers to time at which preparation for consolidating the distributed data D [m, n] in each distributed processing node 1 [n] is completed.

In contrast, in the present embodiment, the following processing is performed before the processing after the aggregation communication described in the first and second embodiments is performed.

Figure 12:
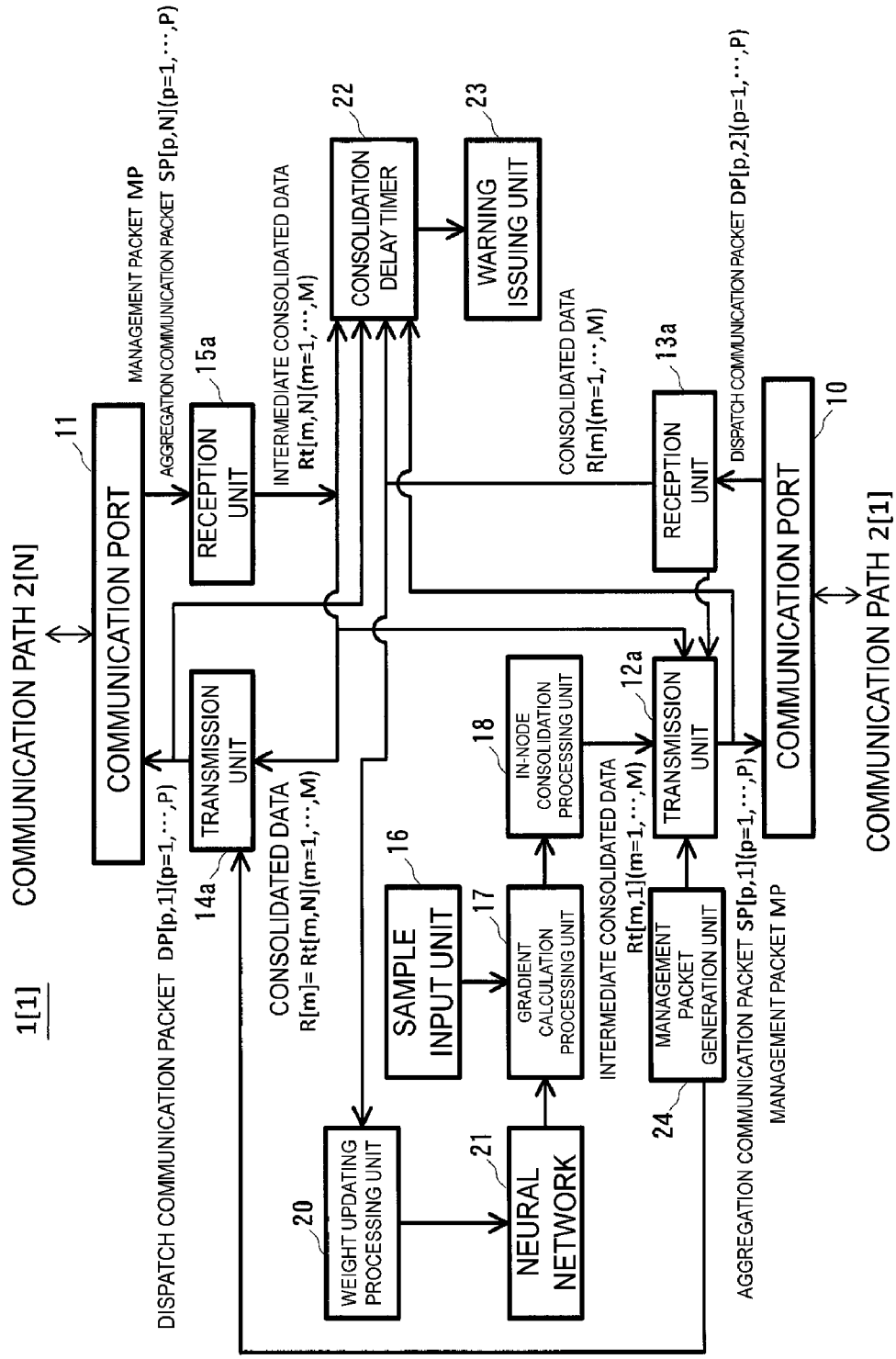
FIG. 12 is a block diagram illustrating a configuration example of the distributed processing node according to a third embodiment of the present invention.
Figure 13:
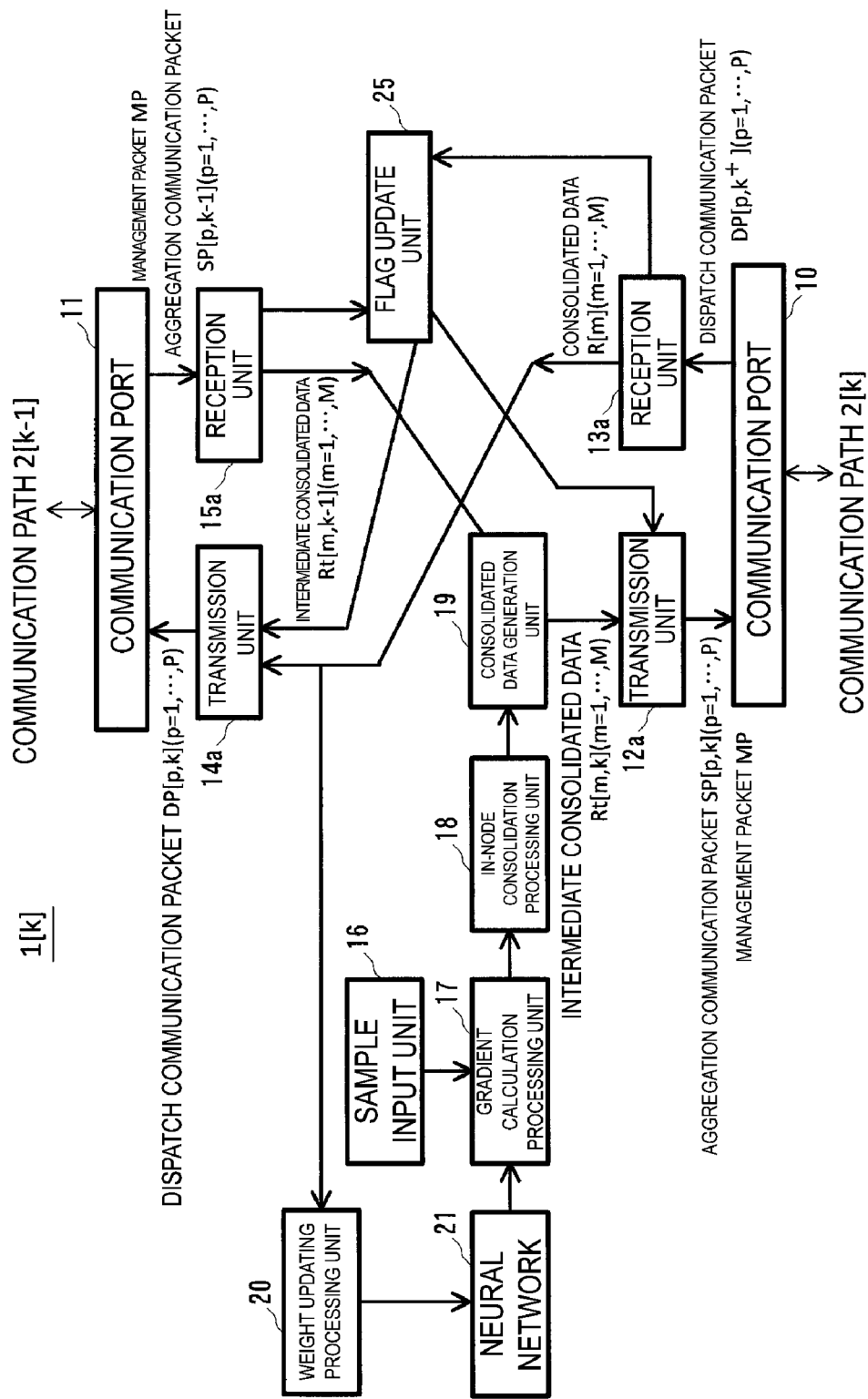
FIG. 13 is a block diagram illustrating a configuration example of the distributed processing node according to the third embodiment of the present invention.

FIG. 12 is a block diagram illustrating a configuration example of the distributed processing node 1 [1] according to the present embodiment, and FIG. 13 is a block diagram illustrating a configuration example of the distributed processing node 1 [k] (k=2, . . . , N) according to the present embodiment.

The distributed processing node 1 [1] includes communication ports 10 and 11, a transmission unit 12a, a reception unit 13a, a transmission unit 14a, a reception unit 15a, a sample input unit 16, a gradient calculation processing unit 17, an in-node consolidation processing unit 18, a weight updating processing unit 20, a neural network 21, a consolidation delay timer 22, a warning issuing unit 23, and a management packet generation unit 24. Here, the management packet generation unit 24 regularly generates management packets including a consolidation start confirmation flag, which indicates whether or not preparation for consolidating the distributed data is completed, before the intermediate consolidated data Rt [m, 1] is transmitted from the communication port 10 of the distributed processing node 1 [1].

The distributed processing node 1 [k] (k=2, . . . , N) includes communication ports 10 and 11, a transmission unit 12a, a reception unit 13a, a transmission unit 14a, a reception unit 15a, a sample input unit 16, a gradient calculation processing unit 17, an in-node consolidation processing unit 18, a consolidated data generation unit 19, a weight updating processing unit 20, a neural network 21, and a flag update unit 25. Here, when preparation for consolidating the distributed data is not completed yet in the distributed processing node 1 [k], the flag update unit 25 updates the value of the consolidation start confirmation flag included in the received management packets to a value indicating that preparation for consolidating the distributed data has not been completed yet.

Figure 14:
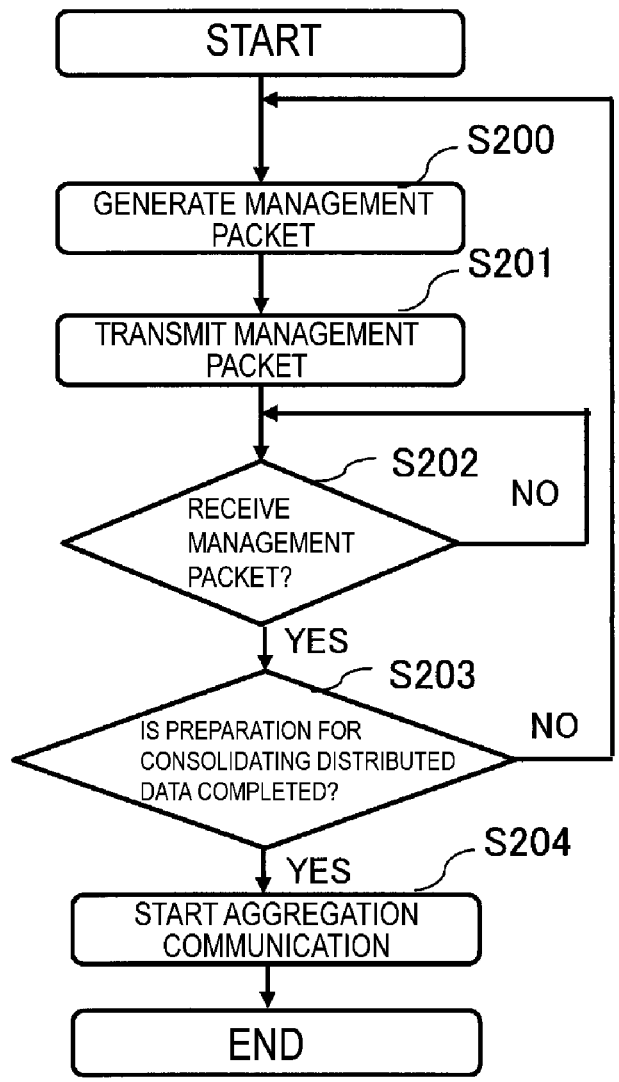
FIG. 14 is a flowchart illustrating processing performed by the distributed processing node according to the third embodiment of the present invention before the aggregation communication process.
Figure 15:
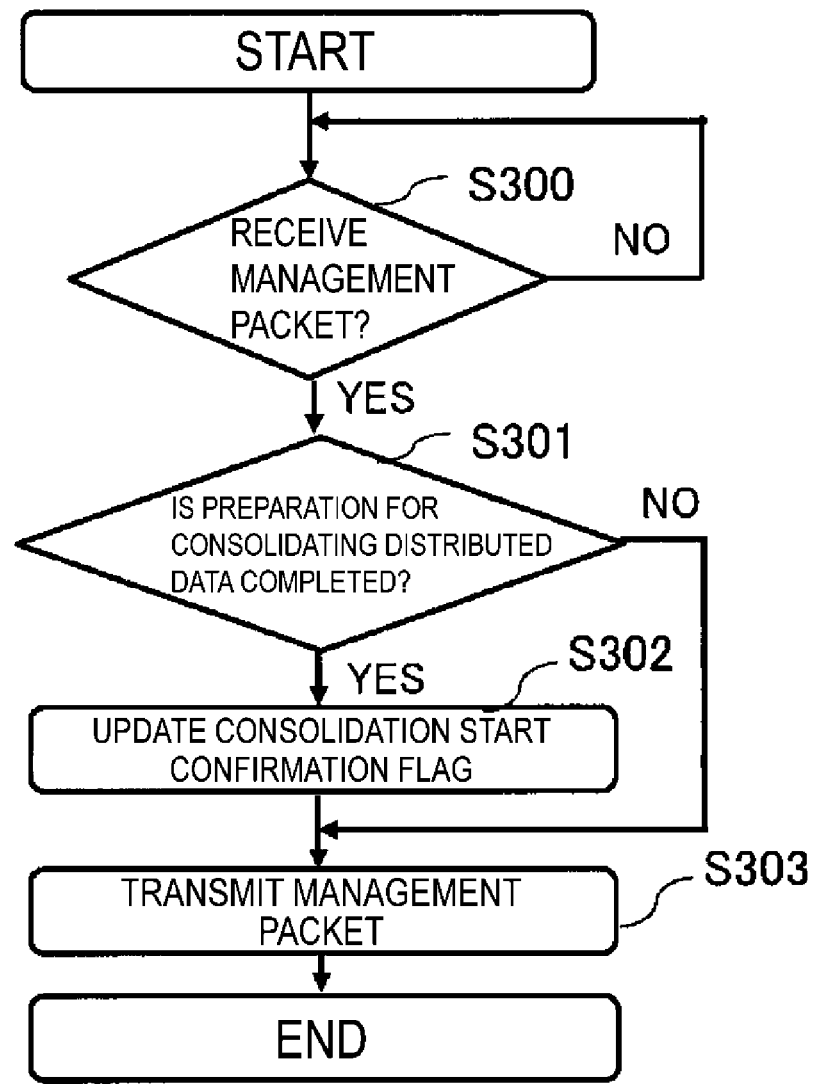
FIG. 15 is a flowchart illustrating processing performed by the distributed processing node according to the third embodiment of the present invention before the aggregation communication process.
Figure 16:
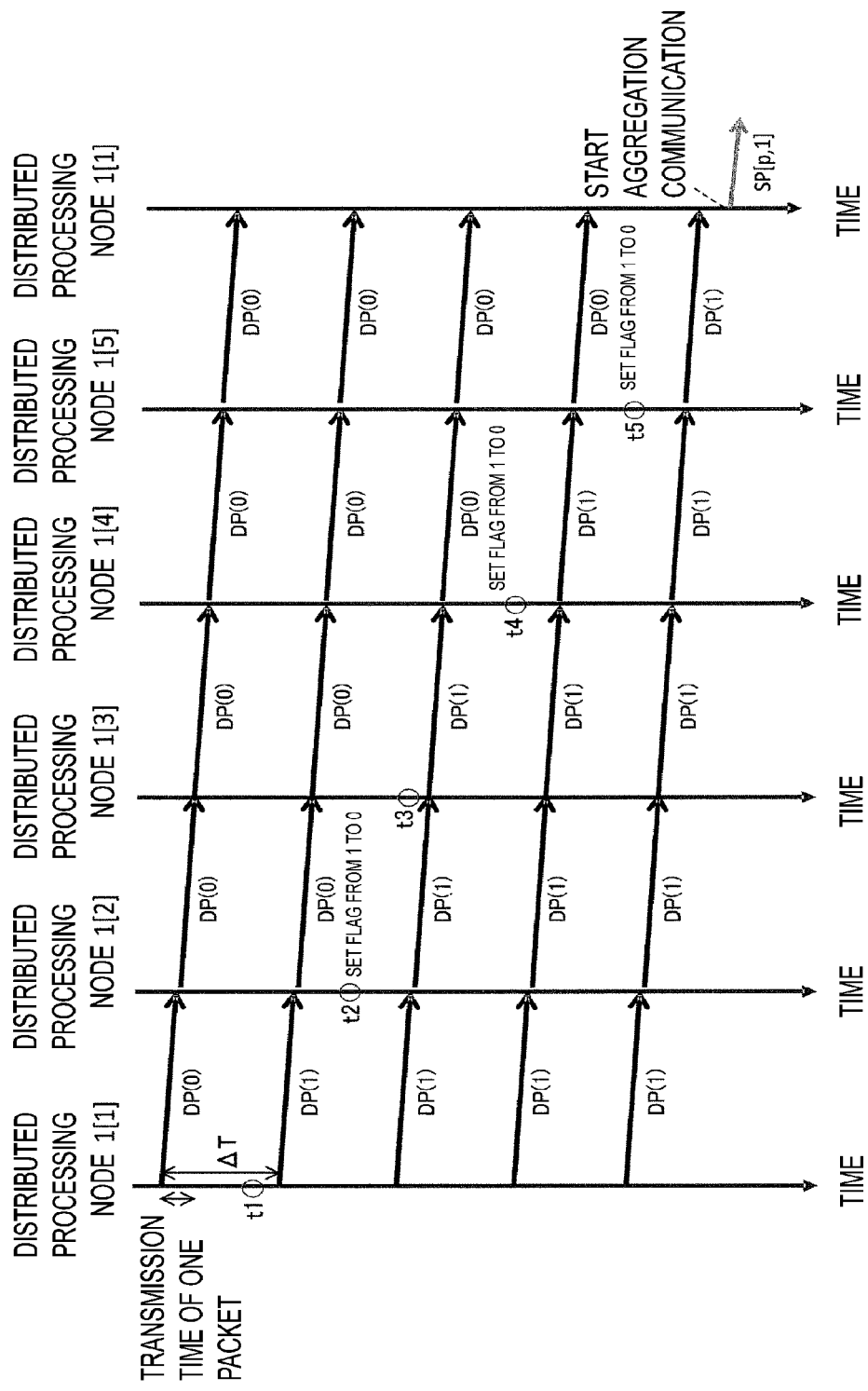
FIG. 16 is a diagram illustrating a sequence of communication between the distributed processing nodes performed before the aggregation communication process in the third embodiment of the present invention.

FIG. 14 is a flowchart illustrating processing performed by the distributed processing node 1 [1] according to the present embodiment before the aggregation communication process, FIG. 15 is a flowchart illustrating processing performed by the distributed processing node 1 [k] (k=2, ..., N) according to the present embodiment before the aggregation communication process, and FIG. 16 is a diagram illustrating a sequence of communication between the distributed processing nodes performed before the aggregation communication process. Note that, in the example of FIG. 16, N=5.

The management packet generation unit 24 of the distributed processing node 1 [1] regularly generates management packets MP including the consolidation start confirmation flag indicating whether or not preparation for consolidating the distributed data has been completed before the intermediate consolidated data Rt [m, 1] is transmitted from the communication port 10 of the distributed processing node 1 [1] (step S200 of FIG. 14).

A generation cycle (ΔT of FIG. 16) of the management packets MP has a value that is sufficiently shorter than the (T2−T1) time period, which is the variation of time at which each distributed processing node 1 [n] completes the preparation for consolidating the distributed data, in consideration of the following influence. Here, the following influence refers to an influence that a communication band not concerned in the present embodiment that passes through each communication path 2 [n] of the distributed processing system is deteriorated due to communication of the management packets MP. When the generation cycle ΔT of the management packets MP has a value close to the (T2−T1) time period, a delay from the time point at which all of the distributed processing nodes 1 [n] complete preparation for consolidating the distributed data to the time point at which the distributed processing node 1 [1] starts the aggregation communication is larger by a single generation cycle ΔT of the management packets MP in the worst case, which deteriorates processing performance of deep learning.

Further, when preparation for consolidating the distributed data D [m, 1] (m=1, ..., M) is not completed in the distributed processing node (generation of the distributed data D [m, 1] by the in-node consolidation processing unit 18 of the distributed processing node is not completed), the management packet generation unit 24 sets the value of the consolidation start confirmation flag to "0", for example. Further, when preparation for consolidating the distributed data D [m, 1] is completed (generation of the distributed data D [m, 1] by the in-node consolidation processing unit 18 of the distributed processing node is completed), the management packet generation unit 24 sets the value of the consolidation start confirmation flag to "1", for example.

The transmission unit 12a of the distributed processing node 1 [1] outputs the management packets MP generated by the management packet generation unit 24 of the distributed processing node 1 [1] to the communication port 10 of the distributed processing node 1 [1]. The management packets MP are transmitted from the communication port 10 to the distributed processing node 1 [2] assigned a succeeding number via the communication path 2 [1] (step S201 of FIG. 14).

MP (0) of FIG. 16 indicates that the value of the consolidation start confirmation flag included in the management packets MP is "0", and MP (1) indicates that the value of the consolidation start confirmation flag is "1". In the example of FIG. 16, at the time point when the distributed processing node 1 [1] first transmits the management packets MP, preparation for consolidating the distributed data D [m, 1] (m=1, ..., M) has not been completed yet, and the management packets MP with the value of the consolidation start confirmation flag being "0" are transmitted from the distributed processing node 1 [1]. On the other hand, at time t1 illustrated in FIG. 16, preparation for consolidating the distributed data D [m, 1] of the distributed processing node 1 [1] has been completed, and thus at time of t1 or later, the management packets MP with the value of the consolidation start confirmation flag being "1" are regularly transmitted from the distributed processing node 1 [1].

Note that, in the present embodiment, the management packets MP are generated. Unlike this case, if the distributed processing node 1 [1] starts the aggregation communication after waiting for the (T2−T1) time period to pass from the time point at which preparation for consolidating the distributed data D [m, 1] (m=1, ..., M) is completed, the variation of the maximum consolidation delay time period can be reduced although processing performance of deep learning may be deteriorated. This is because all of the distributed processing nodes 1 [n] are already in a state after completion of preparation for consolidating the distributed data D [m, n].

The reception unit 15a of the distributed processing node 1 [k] (k=2, ..., N) receives the management packets MP from the distributed processing node 1 [k−1] via the communication port 11 of the distributed processing node 1 [k] and the communication path 2 [k−1] (step S300 of FIG. 15).

When preparation for consolidating the distributed data D [m, k] (m=1, ..., M) is not completed in the distributed processing node 1 [k], the flag update unit 25 of the distributed processing node 1 [k] (k=2, ..., N) updates the value of the consolidation start confirmation flag included in the management packets MP received by the reception unit 15a to ("0"). Then, the flag update unit 25 delivers the management packets MP after update to the transmission unit 12a of the distributed processing node 1 [k] (step S302 of FIG. 15). Here, a case in which preparation for consolidating the distributed data D [m, k] is not completed in the distributed processing node 1 [k] specifically refers to a case in which generation of the distributed data D [m, k] by the in-node consolidation processing unit 18 of the distributed processing node 1 [k] is not completed (YES in step S301 of FIG. 15). Further, the value ("0") of the flag is a value indicating that preparation for consolidating the distributed data D [m, k] is not completed.

Further, when preparation for consolidating the distributed data D [m, k] (m=1, ..., M) is completed in the distributed processing node 1 [k] (NO in step S301), the flag update unit 25 of the distributed processing node 1 [k] (k=2, ..., N) does not update the value of the consolidation start confirmation flag of the management packets MP received by the reception unit 15a. Then, the flag update unit 25 directly delivers the management packets MP to the transmission unit 12a of the distributed processing node 1 [k].

Then, the transmission unit 12a of each distributed processing node 1 [k] (k=2, ..., N) outputs the management packets MP received from the flag update unit 25 of the distributed processing node 1 [k] to the communication port 10 of the distributed processing node 1 [k]. The management packets MP are transmitted from the communication port 10 to the distributed processing node 1 [k$^+$] (k$^+$=k+1; note that k$^+$=1 if k=N) assigned a succeeding number via the communication path 2 [k] (step S303 of FIG. 15).

In the example of FIG. 16, at the time point when the distributed processing node 1 [2] receives the first and second management packets MP from the distributed processing node 1 [1], preparation for consolidating the distributed data D [m, 2] (m=1, . . . , M) is not completed. Thus, after the value of the consolidation start confirmation flag is updated to "0", the management packets MP are transmitted from the distributed processing node 1 [2] to the distributed processing node 1 [3]. In contrast, at time t2 illustrated in FIG. 16, preparation for consolidating the distributed data D [m, 2] of the distributed processing node 1 [2] is completed. Thus, at time of t2 or later, the management packets MP are transmitted from the distributed processing node 1 [2] to the distributed processing node 1 [3] with the value of the consolidation start confirmation flag not being updated but remaining "1".

Similar operation is performed for other distributed processing nodes 1 [3], 1 [4], and 1 [5] as well. Times t3, t4, and t5 of FIG. 16 indicate time at which preparation for consolidating the distributed data is completed in the distributed processing node 1 [3],1 [4],1 [5], respectively.

The reception unit 15*a* of the distributed processing node 1 [1] receives the management packets MP from the distributed processing node 1 [N] via the communication port 11 of the distributed processing node 1 [1] and the communication path 2 [N] (step S202 of FIG. 14).

When the consolidation start confirmation flag included in the management packets MP received by the reception unit 15*a* of the distributed processing node 1 [1] has a value ("1") indicating that preparation for consolidating the distributed data is completed (YES in step S203 of FIG. 14), the transmission unit 12*a* of the distributed processing node 1 [1] starts the aggregation communication (step S204 of FIG. 14). Specifically, in a similar manner to the first and second embodiments, the transmission unit 12*a* uses the distributed data D [m, 1] as the intermediate consolidated data Rt [m, 1], packetizes the intermediate consolidated data Rt [m, 1], and outputs the generated aggregation communication packets SP [p, 1] (p=1, . . . , P) to the communication port 10 of the distributed processing node 1 [1]. The aggregation communication packets SP [p, 1] are transmitted from the communication port 10 to the distributed processing node 1 [2] assigned a succeeding number via the communication path 2 [1] (step S104 of FIG. 3).

Further, when the consolidation start confirmation flag included in the management packets MP received by the reception unit 15*a* of the distributed processing node 1 [1] has a value ("0") indicating that preparation for consolidating the distributed data is not completed, the distributed processing node 1 [1] returns to step S200. In this manner, processing from step S200 to S203 is repeatedly performed until the consolidation start confirmation flag included in the management packets MP received by the reception unit 15*a* has a value ("1") indicating that preparation for consolidating the distributed data is completed.

Processing after the start of the aggregation communication is the same as that described in the first and second embodiments. Each distributed processing node 1 [n] (n=1, . . . , N) according to the present embodiment only needs to perform processing described in FIG. 14 to FIG. 16, FIG. 3 to FIG. 4, and FIG. 9 to FIG. 11 for each mini batch learning.

In the present embodiment, if preparation for consolidating the distributed data is not completed in at least one distributed processing node 1 [n] (n=1, . . . , N), the consolidation start confirmation flag of the management packets MP is updated by the distributed processing node to a value indicating that preparation for consolidating the distributed data is not completed. Even if a distributed processing node that has completed preparation for consolidating the distributed data is present after the above-mentioned distributed processing node, the consolidation start confirmation flag of the management packets MP is relayed without being updated, and thus the distributed processing node 1 [1] can be informed that there is a distributed processing node that has not completed preparation for consolidating the distributed data.

Note that, in the present embodiment, in a similar manner to the aggregation communication, relay of the management packets MP is performed in the following route: the distributed processing node 1 [1]→the distributed processing node [2]→ . . . →the distributed processing node [N]→the distributed processing node 1 [1].

In contrast, in a similar manner to the dispatch communication, relay of the management packets MP may be performed in the following route: the distributed processing node 1 [1]→the distributed processing node [N]→ . . . →the distributed processing node [2]→the distributed processing node 1 [1]. In this case, instead of the transmission unit 12*a* of the distributed processing node 1 [1], the transmission unit 14*a* performs transmission of the management packets MP to the distributed processing node 1 [N] (step S201 of FIG. 14). Further, instead of the reception unit 15*a* of the distributed processing node 1 [k] (k=2, . . . , N), the reception unit 13*a* receives the management packets MP from the distributed processing node 1 [k⁺] (k⁺=k+1; note that k⁺=1 if k=N) (step S300 of FIG. 15).

Further, instead of the transmission unit 12*a* of the distributed processing node 1 [k], the transmission unit 14*a* transmits the management packets MP received from the flag update unit 25 of the distributed processing node 1 [k] to the distributed processing node 1 [K−1] (step S303 of FIG. 15). Further, instead of the reception unit 15*a* of the distributed processing node 1 [1], the reception unit 13*a* receives the management packets MP from the distributed processing node 1 [2] (step S202 of FIG. 14). When the consolidation start confirmation flag included in the management packets MP received from the reception unit 13*a* of the distributed processing node 1 [1] has a value ("1") indicating that preparation for consolidating the distributed data is completed (YES in step S203 of FIG. 14), it is only necessary that the transmission unit 12*a* of the distributed processing node 1 [1] start the aggregation communication (step S204 of FIG. 14).

Further, simultaneously with the relay of the management packets MP being performed in the route of the distributed processing node 1 [1]→the distributed processing node [2]→ . . . →the distributed processing node [N]→the distributed processing node 1 [1], the relay of the management packets MP may be performed in the following route: the distributed processing node 1 [1]→the distributed processing node [N]→ . . . →the distributed processing node [2]→the distributed processing node 1 [1]. In this case, it is only necessary that the transmission unit 12*a* of the distributed processing node 1 [1] start the aggregation communication in the following case. The following case refers to a case in which the consolidation start confirmation flag included in the management packets MP received by the reception unit 15*a* of the distributed processing node has a value indicating that preparation for consolidating the distributed data is completed and the consolidation start confirmation flag included in the management packets MP received by the reception unit 15*a* of the distributed processing node has a value indicating that preparation for consolidating the distributed data is completed.

Further, the start of the generation and transmission of the management packets MP by the distributed processing node 1 [1] can also be started at a time point when the distributed processing node 1 [1] does not complete preparation for consolidating the distributed data as illustrated in FIG. 16 other than the method of starting at the time point when the distributed processing node 1 [1] completes preparation for consolidating the distributed data. For example, generation and transmission of the management packets MP can also be performed in provision for the start of the next aggregation communication after completion of the dispatch communication. In this manner, during a period in which the aggregation communication and the dispatch communication are not performed, with the distributed processing node 1 [1] regularly starting a flow and checking a return of the management packets MP, this can be used to check whether each node and communication path is normal.

In this manner, in the present embodiment, at a time point when the distributed processing node 1 [1] starts the aggregation communication, it is ensured that other distributed processing nodes 1 [k] (k=2, . . . , N) are also in a state capable of starting the aggregation communication. Thus, the variation (T2−T1) at a time when each distributed processing node 1 [n] completes preparation for consolidating the distributed data D [m, n] need not be added to the value of the maximum consolidation delay time period, and the maximum consolidation delay time period can be reduced accordingly.

Each of the distributed processing node 1 [n] (n=1, . . . , N) described in the first to third embodiments can be realized by a computer including a central processing unit (CPU), a storage device, and an interface, and programs for controlling these hardware resources.

Figure 17:
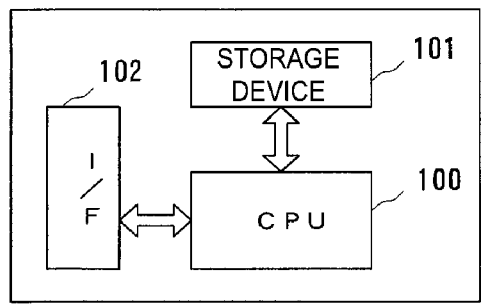
FIG. 17 is a block diagram illustrating a configuration example of a computer that implements the distributed processing node according to the first to third embodiments of the present invention.
Figure 18:
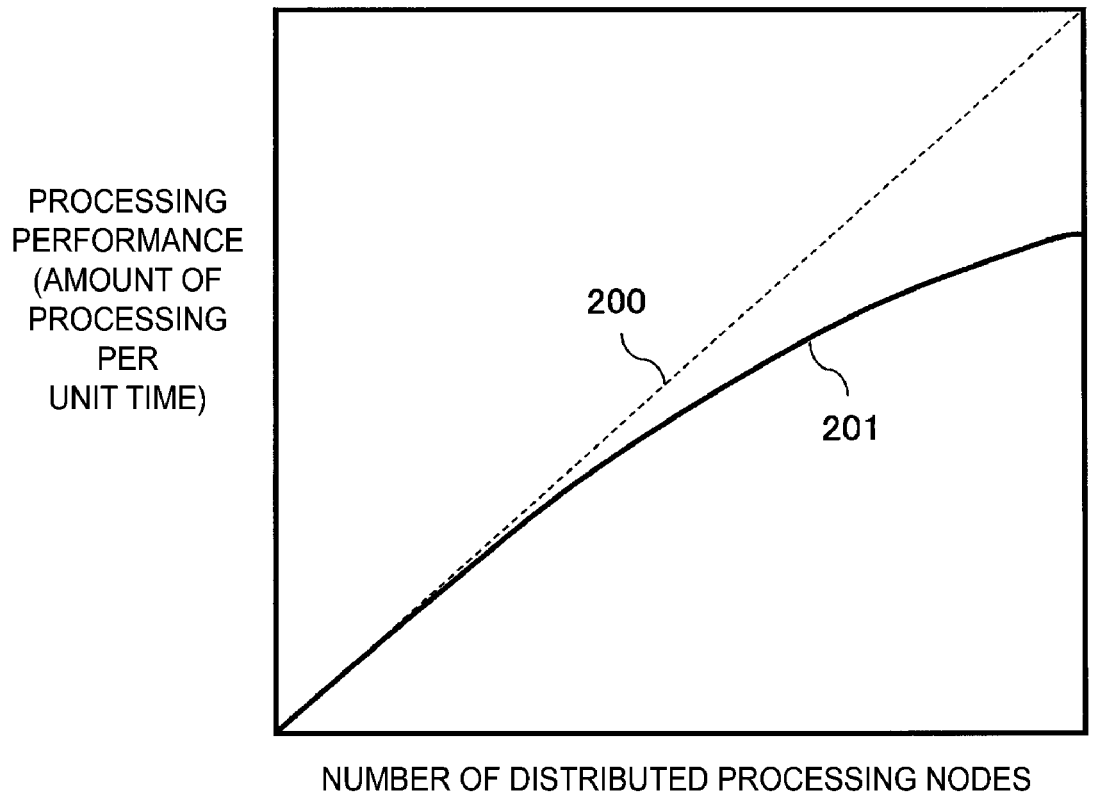
FIG. 18 is a diagram illustrating a relationship between the number of distributed processing nodes and processing performance of deep learning in a distributed processing system of the related art.

A configuration example of the computer is illustrated in FIG. 17. The computer includes a CPU 100, a storage device 101, and an interface device (hereinafter abbreviated as an I/F) 102. For example, a communication circuit including the communication ports 10 and 11 is connected to the I/F 102. The CPU 100 executes the processing described in the first to third embodiments in accordance with the programs stored in the storage device 101, and thereby implements the distributed processing system and the distributed processing method according to the present invention.

INDUSTRIAL APPLICABILITY

The embodiments of the present invention can be applied to techniques for performing machine learning of a neural network.

REFERENCE SIGNS LIST

1 . . . Distributed processing node
2 . . . Communication path
10, 11 . . . Communication port
12, 12a, 14, 14a . . . Transmission unit
13, 13a, 15, 15a . . . Reception unit
16 . . . Sample input unit
17 . . . Gradient calculation processing unit
18 . . . In-node consolidation processing unit
19 . . . Consolidated data generation unit
20 . . . Weight updating processing unit
21 . . . Neural network
22 . . . Consolidation delay timer
23 . . . Warning issuing unit
24 . . . Management packet generation unit
25 . . . Flag update unit

The invention claimed is:

1. A distributed processing system comprising:

N distributed processing nodes disposed in a ring shape and connected to adjacent nodes via a communication path, wherein N is an integer of 2 or greater, wherein:
  an n-th (n=1, . . . , N) distributed processing node includes a first communication port configured to perform simultaneous bidirectional communication with an $n^+$-th distributed processing node, wherein $n^+$=n+1 provided that $n^+$=1 if n=N, and a second communication port configured to perform simultaneous bidirectional communication with an $n^-$-th distributed processing node, wherein $n^-$=n−1 provided that $n^-$=N if n=1;
  each of the distributed processing nodes is configured to generate distributed data for each of M weights w [m] of a neural network of a learning target, wherein M is an integer of 2 or greater and m=1, . . . , M;
  out of the N distributed processing nodes, a first distributed processing node specified in advance is configured to use the distributed data generated in the first distributed processing node as first consolidated data, packetize the first consolidated data in order of numbers m of the weights w [m], and transmit the first consolidated data from the first communication port of the first distributed processing node to a second distributed processing node;
  out of the N distributed processing nodes, a k-th distributed processing node except the first distributed processing node is configured to generate updated first consolidated data by calculating a sum of the first consolidated data received via the second communication port of the k-th distributed processing node from a (k−1)-th distributed processing node and the distributed data generated in the k-th distributed processing node for each corresponding one of the weights w [m], wherein k=2, . . . , N, packetize the first consolidated data in the order of the numbers m, and transmit the first consolidated data from the first communication port of the k-th distributed processing node to a $k^+$-th distributed processing node, wherein $k^+$=k+1 provided that $k^+$=1 if k=N;
  the first distributed processing node is configured to use the first consolidated data received via the second communication port of the first distributed processing node from an N-th distributed processing node as second consolidated data, packetize the second consolidated data in the order of the numbers m, and transmit the second consolidated data from the second communication port of the first distributed processing node to the N-th distributed processing node;
  the k-th distributed processing node is configured to packetize the second consolidated data received via the first communication port of the k-th distributed processing node from the $k^+$-th distributed processing node in the order of the numbers m, and transmit the second consolidated data from the second communication port of the k-th distributed processing node to the (k−1)-th distributed processing node;
  the first distributed processing node is configured to receive the second consolidated data from the second distributed processing node via the first communication port of the first distributed processing node;
  each distributed processing node is configured to update the weights w [m] of the neural network, based on the second consolidated data; and when an aggregation communication time period required by each of the distributed processing nodes to consolidate the distributed data or an aggregation dispatch communication time period being a total time period of the aggregation communication time period and a time period required by each of the distributed processing nodes to dispatch the second consolidated data exceeds a predetermined maximum consolidation delay time period, the first distributed processing node is configured to issue a warning indicating a consolidation delay anomaly.

2. The distributed processing system according to claim 1, wherein each of the N distributed processing nodes includes:

an in-node consolidation processor configured to generate the distributed data;

a first transmitter configured to, when a respective one of the distributed processing nodes functions as the first distributed processing node, packetize the first consolidated data in the order of the numbers m of the weights w [m] and transmit the first consolidated data from the first communication port of the respective one of the distributed processing nodes to the second distributed processing node, and configured to, when the respective one of the distributed processing nodes functions as the k-th distributed processing node, packetize the updated first consolidated data in the order of the numbers m and transmit the updated first consolidated data from the first communication port of the respective one of the distributed processing nodes to the $k^+$-th distributed processing node;

a first receiver configured to acquire the first consolidated data from a packet received from the second communication port of the respective one of the distributed processing nodes;

a second transmitter configured to, when the respective one of the distributed processing nodes functions as the first distributed processing node, packetize the second consolidated data in the order of the numbers m and transmit the second consolidated data from the second communication port of the respective one of the distributed processing nodes to the N-th distributed processing node, and configured to, when the respective one of the distributed processing nodes functions as the k-th distributed processing node, packetize the received second consolidated data in the order of the numbers m and transmit the received second consolidated data from the second communication port of the respective one of the distributed processing nodes to the (k−1)-th distributed processing node;

a second receiver configured to acquire the second consolidated data from a packet received from the first communication port of the respective one of the distributed processing nodes;

a consolidated data generator configured to generate the updated first consolidated data when the respective one of the distributed processing nodes functions as the k-th distributed processing node;

a weight updating processor configured to update the weights w [m] of the neural network, based on the received second consolidated data;

a timer configured to, when the respective one of the distributed processing nodes functions as the first distributed processing node, measure a time period from a time point when the first consolidated data is transmitted to the second distributed processing node to a time point when the first consolidated data is received from the N-th distributed processing node as the aggregation communication time period, and a time period from a time point when the first consolidated data is transmitted to the second distributed processing node to a time point when the second consolidated data is received from the second distributed processing node as the aggregation dispatch communication time period; and a warning issuer configured to, when the respective one of the distributed processing nodes functions as the first distributed processing node, issue a warning indicating a consolidation delay anomaly when the aggregation communication time period or the aggregation dispatch communication time period exceeds the maximum consolidation delay time period.

3. The distributed processing system according to claim 2, wherein:

the first distributed processing node is configured to regularly generate a management packet including a consolidation start confirmation flag indicating whether or not preparation for consolidating the distributed data is completed, before the first consolidated data is transmitted from the first communication port of the first distributed processing node, and transmit the management packet from at least one of the first communication port and the second communication port of the first distributed processing node to at least one of the second distributed processing node and the N-th distributed processing node;

the k-th distributed processing node is configured to update a consolidation start confirmation flag included in the received management packet to a value indicating that the preparation for consolidating the distributed data is not completed and transmit the management packet after update from a communication port different from a port used to receive the management packet out of the first and second communication ports to the $k^+$-th distributed processing node or the (k−1)-th distributed processing node when the k-th distributed processing node receives the management packet from the (k−1)-th distributed processing node via the second communication port of the k-th distributed processing node or when the k-th distributed processing node receives the management packet from the $k^+$-th distributed processing node via the first communication port of the k-th distributed processing node and preparation for consolidating the distributed data is not completed in the k-th distributed processing node, and the k-th distributed processing node is configured to transmit the received management packet from a communication port different from a port used to receive the management packet out of the first and second communication ports to the $k^+$-th distributed processing node or the (k−1)-th distributed processing node when the preparation for consolidating the distributed data is completed in the k-th distributed processing node; and the first distributed processing node is configured to start transmission of the first consolidated data when the first distributed processing node receives the management packet from the N-th distributed processing node via the second communication port of the first distributed processing node or when the first distributed processing node receives the management packet from the second distributed processing node via the first communication port of the first distributed processing node and the consolidation start confirmation flag included in the received management packet has a value indicating that preparation for consolidating the distributed data is completed.

4. The distributed processing system according to claim 1, wherein:

the first distributed processing node is configured to regularly generate a management packet including a consolidation start confirmation flag indicating whether or not preparation for consolidating the distributed data is completed, before the first consolidated data is transmitted from the first communication port of the first distributed processing node, and transmit the management packet from at least one of the first communication port and the second communication port of the first distributed processing node to at least one of the second distributed processing node and the N-th distributed processing node;

the k-th distributed processing node is configured to update a consolidation start confirmation flag included in the received management packet to a value indicating that the preparation for consolidating the distributed data is not completed and transmit the management packet after update from a communication port different from a port used to receive the management packet out of the first and second communication ports to the $k^+$-th distributed processing node or the (k−1)-th distributed processing node when the k-th distributed processing node receives the management packet from the (k−1)-th distributed processing node via the second communication port of the k-th distributed processing node or when the k-th distributed processing node receives the management packet from the $k^+$-th distributed processing node via the first communication port of the k-th distributed processing node and preparation for consolidating the distributed data is not completed in the k-th distributed processing node, and the k-th distributed processing node is configured to transmit the received management packet from a communication port different from a port used to receive the management packet out of the first and second communication ports to the $k^+$-th distributed processing node or the (k−1)-th distributed processing node when the preparation for consolidating the distributed data is completed in the k-th distributed processing node; and the first distributed processing node is configured to start transmission of the first consolidated data when the first distributed processing node receives the management packet from the N-th distributed processing node via the second communication port of the first distributed processing node or when the first distributed processing node receives the management packet from the second distributed processing node via the first communication port of the first distributed processing node and the consolidation start confirmation flag included in the received management packet has a value indicating that preparation for consolidating the distributed data is completed.

5. A distributed processing method of a system including N distributed processing nodes, wherein N is an integer of 2 or greater, disposed in a ring shape and connected to adjacent nodes via a communication path in which an n-th distributed processing node, wherein n=1, ..., N, includes a first communication port for performing simultaneous bidirectional communication with an $n^+$-th distributed processing node, wherein $n^+$=n+1 provided that $n^+$=1 if n=N, and a second communication port for performing simultaneous bidirectional communication with an $n^-$-th distributed processing node, wherein $n^-$=n−1 provided that $n^-$=N if n=1, the distributed processing method comprising:

a first step at each of the distributed processing nodes of generating distributed data for each of M weights w [m] of a neural network of a learning target, wherein M is an integer of 2 or greater and m=1, ..., M;

a second step, at a first distributed processing node specified in advance out of the N distributed processing nodes, of using the distributed data generated in the first distributed processing node as first consolidated data, packetizing the first consolidated data in order of numbers m of the weights w [m], and transmitting the first consolidated data from the first communication port of the first distributed processing node to a second distributed processing node;

a third step, at a k-th distributed processing node out of the N distributed processing nodes except the first distributed processing node, of generating updated first consolidated data by calculating a sum of the first consolidated data received via the second communication port of the k-th distributed processing node from a (k−1)-th distributed processing node and the distributed data generated in the k-th (k=2, ..., N) distributed processing node for each corresponding one of the weights w [m], packetizing the first consolidated data in the order of the numbers m, and transmitting the first consolidated data from the first communication port of the k-th distributed processing node to a $k^+$-th distributed processing node, wherein $k^+$=k+1 or $k^+$=1 if k=N;

a fourth step at the first distributed processing node of using the first consolidated data received via the second communication port of the first distributed processing node from an N-th distributed processing node as second consolidated data, packetizing the second consolidated data in the order of the numbers m, and transmitting the second consolidated data from the second communication port of the first distributed processing node to the N-th distributed processing node;

a fifth step at the k-th distributed processing node of packetizing the second consolidated data received via the first communication port of the k-th distributed processing node from the $k^+$-th distributed processing node in the order of the numbers m, and transmitting the second consolidated data from the second communication port of the k-th distributed processing node to the (k−1)-th distributed processing node;

a sixth step at the first distributed processing node of receiving the second consolidated data from the second distributed processing node via the first communication port of the first distributed processing node;

a seventh step at each distributed processing node of updating the weights w [m] of the neural network, based on the received second consolidated data;

an eighth step at the first distributed processing node of measuring an aggregation communication time period required by each of the distributed processing nodes to consolidate the distributed data or an aggregation dispatch communication time period being a total time period of the aggregation communication time period and a time period required by each of the distributed processing nodes to dispatch the second consolidated data; and a ninth step at the first distributed processing node of issuing a warning indicating a consolidation delay anomaly when the aggregation communication time period or the aggregation dispatch communication time period exceeds a predetermined maximum consolidation delay time period.

6. The distributed processing method according to claim 5, wherein:
the third step includes, at the k-th distributed processing node, acquiring the first consolidated data from a packet received from the second communication port of the k-th distributed processing node, generating the updated first consolidated data, and packetizing the updated first consolidated data in the order of the numbers m and transmitting the updated first consolidated data to the $k^+$-th distributed processing node from the first communication port of the k-th distributed processing node;
the fourth step includes, at the first distributed processing node, acquiring the first consolidated data from a packet received from the second communication port of the first distributed processing node and using the acquired first consolidated data as the second consolidated data, packetizing the second consolidated data in the order of the numbers m, and transmitting the second consolidated data from the second communication port of the first distributed processing node to the N-th distributed processing node;
the fifth step includes, at the k-th distributed processing node, acquiring the second consolidated data from a packet received from the first communication port of the k-th distributed processing node, packetizing the received second consolidated data in the order of the numbers m, and transmitting the received second consolidated data from the second communication port of the k-th distributed processing node to the (k−1)-th distributed processing node;
the sixth step includes, at the first distributed processing node, acquiring the second consolidated data from a packet received from the first communication port of the first distributed processing node; and
the eighth step includes, at the first distributed processing node, measuring a time period from a time point when the first consolidated data is transmitted to the second distributed processing node to a time point when the first consolidated data is received from the N-th distributed processing node as the aggregation communication time period, and a time period from a time point when the first consolidated data is transmitted to the second distributed processing node to a time point when the second consolidated data is received from the second distributed processing node as the aggregation dispatch communication time period.

7. The distributed processing method according to claim 6, further comprising:
a tenth step at the first distributed processing node of regularly generating a management packet including a consolidation start confirmation flag indicating whether or not preparation for consolidating the distributed data is completed, before the first consolidated data is transmitted from the first communication port of the first distributed processing node, and transmitting the management packet from at least one of the first communication port and the second communication port of the first distributed processing node to at least one of the second distributed processing node and the N-th distributed processing node;
an eleventh step at the k-th distributed processing node of updating a consolidation start confirmation flag included in the received management packet to a value indicating that the preparation for consolidating the distributed data is not completed and transmitting the management packet after update from a communication port different from a port used to receive the management packet out of the first and second communication ports to the $k^+$-th distributed processing node or the (k−1)-th distributed processing node when the k-th distributed processing node receives the management packet from the (k−1)-th distributed processing node via the second communication port of the k-th distributed processing node or when the k-th distributed processing node receives the management packet from the $k^+$-th distributed processing node via the first communication port of the k-th distributed processing node and preparation for consolidating the distributed data is not completed in the k-th distributed processing node, and transmitting the received management packet from a communication port different from a port used to receive the management packet out of the first and second communication ports to the $k^+$-th distributed processing node or the (k−1)-th distributed processing node when the preparation for consolidating the distributed data is completed in the k-th distributed processing node; and
a twelfth step at the first distributed processing node of starting transmission of the first consolidated data of the second step when the first distributed processing node receives the management packet from the N-th distributed processing node via the second communication port of the first distributed processing node or when the first distributed processing node receives the management packet from the second distributed processing node via the first communication port of the first distributed processing node and the consolidation start confirmation flag included in the received management packet has a value indicating that preparation for consolidating the distributed data is completed.

8. The distributed processing method according to claim 5, further comprising:
a tenth step at the first distributed processing node of regularly generating a management packet including a consolidation start confirmation flag indicating whether or not preparation for consolidating the distributed data is completed, before the first consolidated data is transmitted from the first communication port of the first distributed processing node, and transmitting the management packet from at least one of the first communication port and the second communication port of the first distributed processing node to at least one of the second distributed processing node and the N-th distributed processing node;
an eleventh step at the k-th distributed processing node of updating a consolidation start confirmation flag included in the received management packet to a value indicating that the preparation for consolidating the distributed data is not completed and transmitting the management packet after update from a communication port different from a port used to receive the management packet out of the first and second communication ports to the $k^+$-th distributed processing node or the (k−1)-th distributed processing node when the k-th distributed processing node receives the management packet from the (k−1)-th distributed processing node via the second communication port of the k-th distributed processing node or when the k-th distributed processing node receives the management packet from the $k^+$-th distributed processing node via the first communication port of the k-th distributed processing node and preparation for consolidating the distributed data is not completed in the k-th distributed processing node, and transmitting the received management packet from a communication port different from a port used to receive the management packet out of the first and second communication ports to the $k^+$-th distributed processing node or the (k−1)-th distributed processing node when the preparation for consolidating the distributed data is completed in the k-th distributed processing node; and a twelfth step at the first distributed processing node of starting transmission of the first consolidated data of the second step when the first distributed processing node receives the management packet from the N-th distributed processing node via the second communication port of the first distributed processing node or when the first distributed processing node receives the management packet from the second distributed processing node via the first communication port of the first distributed processing node and the consolidation start confirmation flag included in the received management packet has a value indicating that preparation for consolidating the distributed data is completed.

\* \* \* \* \*